United States Patent [19]

Deschner

[11] 4,257,499

[45] Mar. 24, 1981

[54] HYDRAULIC CARTRIDGE FOR IMPROVED MOTION CONTROL

[76] Inventor: Richard E. Deschner, 5550 Harcross Dr., Los Angeles, Calif. 90043

[21] Appl. No.: 974,238

[22] Filed: Dec. 29, 1978

Related U.S. Application Data

[63] Continuation of Ser. No. 783,006, Mar. 30, 1977, abandoned.

[51] Int. Cl.³ .......................... F16F 9/19; F16F 9/346; F16F 9/42

[52] U.S. Cl. .................................... 188/287; 188/298; 188/315; 267/64 R

[58] Field of Search .................... 267/64 R, 64 B, 124, 267/125, 126, 127; 188/282, 285, 287, 298, 313, 315, 318, 322; 137/71

[56] References Cited

U.S. PATENT DOCUMENTS

| | | | |
|---|---|---|---|
| 2,392,387 | 1/1946 | Jay | 267/64 R |
| 2,562,672 | 7/1951 | Kunert | 137/71 |
| 3,027,152 | 3/1962 | Deschner | 188/298 |
| 3,176,972 | 4/1965 | Deschner | 188/287 |
| 3,392,849 | 7/1968 | Rasmussen | 188/298 |
| 3,680,970 | 8/1972 | Deschner | 267/125 |
| 3,726,419 | 4/1973 | Anderson et al. | 188/298 |
| 3,771,626 | 11/1973 | Palmer | 188/298 |
| 3,819,166 | 6/1974 | Ellis et al. | 267/64 R |
| 3,891,199 | 6/1975 | Willich et al. | 188/298 |
| 3,892,298 | 7/1975 | Blatt | 267/64 R |
| 3,918,693 | 11/1975 | Zahid | 188/298 |
| 3,990,548 | 11/1976 | Schupner | 188/313 |
| 4,122,923 | 10/1978 | Ellis et al. | 188/315 |

FOREIGN PATENT DOCUMENTS

| | | | |
|---|---|---|---|
| 690987 | 7/1964 | Canada | 267/64 B |
| 1245224 | 7/1967 | Fed. Rep. of Germany | 188/315 |
| 2221945 | 11/1972 | Fed. Rep. of Germany | 188/298 |
| 275714 | 8/1927 | United Kingdom | 267/64 R |

OTHER PUBLICATIONS

*Cushioneer Type* 2000, Deschner Corp., Bulletin No. S-29b, 1972.

*Kinecheks Type* 1000, Deschner Corp., Bulletin No. S-27b, 1972.

*Primary Examiner*—Edward R. Kazenske

*Attorney, Agent, or Firm*—Stevens, Davis, Miller & Mosher

[57] ABSTRACT

An improved type of hydraulic control cartridge with mounting structure and accessorial safety device for installation within both ends of reciprocative pneumatic actuators to permit a safe increase in their speed of operation. The safety device automatically stops the actuator if the hydraulic cartridge malfunctions.

24 Claims, 44 Drawing Figures

HYDRAULIC CARTRIDGE FOR IMPROVED MOTION CONTROL

This is a continuation of application Ser. No. 783,006, filed Mar. 30, 1977, now abandoned.

Cross Reference to Related Patents

The improved hydraulic cartridge described herein is similar in some respects to those described in U.S. Pat. Nos. 3,027,152 and 3,176,972. Also relevant are U.S. Pat. No. 3,680,970 and industrial bulletins entitled "Cushioneer" and "Kinecheks".

BACKGROUND OF THE INVENTION

1. Field of the Invention

Many types of industrial machinery have reciprocative or oscillatory mechanisms actuated pneumatically or by gravity or srings. A majority of such devices are operated by reciprocative pneumatic actuators, and in the main, the present disclosure describes problems involved in the use of such actuators and the solution of those problems. It is intended however that the use of the new improved hydraulic cartridges described herein not be limited to pneumatic actuators.

2. Description of the Prior Art Regarding Actuators

The usual reciprocative pneumatic actuator consists of a single cylinder with reciprocative piston and rod, the cylinder being closed at its ends by heads through which compressed air is supplied and exhausted. When compressed air enters the cylinder it tends to move the air piston so quickly and with such force that the piston and any moving load attached to it strike with heavy impact at the ends of the stroke. The impact resulting from an air piston striking the heads can be severe enough to damage the actuator and the mechanism driven by it. The impact can easily be great enough to shear off the mounting bolts of the actuator completely, thereby releasing the same from its base. The consequent danger to personnel and equipment is readily understandable, yet many pneumatic actuators are operated just as they are received from the seller, with no safeguarding against impact, so that direct impact of the piston against one or both of the heads often provides the only means of stopping the piston and its attached load. Such actuators must be operated at low speed at much less than their potential power output to save them from destruction. Operation at a safe low speed is usually accomplished by restricting the flow of air to or from the actuator, most pneumatic actuators being operated at speeds much lower than would be most economical for the moving load attached to them, because the operator adjusts the airflow low enough to be on the safe side. An expensive loss in efficiency occurs then because the full stroke of the air piston must be traveled at low speed, with consequent low productive capacity of the device.

3. Prior Art Regarding Pneumatic Cushions

Pneumatic actuators may be purchased equipped with one or two pneumatic cushions, each of which consists of a valving device for closing the exhaust passage at one of the cylinder to trap air to decelerate the piston as it reaches the end of its stroke. This type of cushion is effective only for slow moving or lightly loaded pistons. The trapped air acts like a spring and has relatively little decelerative action because it is not compressed to an effective braking pressure until a small fraction of an inch before the piston reaches the end of its stroke.

4. Prior Art Regarding External Hydraulic Decelerators

Moving mechanisms actuated by pneumatic actuators are sometimes equipped with external hydraulic decelerators to decelerate the mechanism at the ends of its stroke to permit a high operating speed. One type of such decelerator unit is described in the enclosed bulletin entitled "Cushioneer". It consists of a hydraulic cylinder with a reciprocative fluid damped plunger and is usually mounted at a distance from the actuator so that some portion of the moving mechanism strikes the plunger.

A notable point is that with such an arrangement, each time the moving load is brought to a stop, the hydraulic decelerator converts to heat a large percentage of the air power expended during the stroke, the heat being generated by friction within the hydraulic fluid as it is forced through restrictive flow passageways. If operation of the pneumatic actuator is fast and continual, the decelerator becomes so hot that the elastomeric seals it contains may be damaged unless the decelerator is cooled by some external means that dissipates the heat. A measure of cooling can be effected by leading the exhaust air from the actuator to impinge against the outside surface of the body of a decelerator as illustrated at upper right on page 2 of the above referenced Cushioneer bulletin, but it can be seen that at best this type of cooling is not only a makeshift arrangement but all of the energy taken from the moving load is lost.

A second notable point is that oftentimes the need for cooling is neither understood nor apparent to the installer of a decelerator, and unfortunatley, the instructions furnished by decelerator manufactureres are often disregarded. When external decelerators are insufficiently cooled and are operated at high speed and/or high loads, the hydraulic fluid becomes overheated and reduced in viscosity so that the moving load may not be decelerated sufficiently to prevent the moving parts from striking with heavy impact. Frequent shut-downs are necessary to repair damage resulting from this type of operation.

A third point is that situations often occur in the field of hydraulic decelerators where considerable technical "know how" is required for a user or a salesman to choose and install a decelerator properly. The responsible person must be able to calculate load weight and velocity, and to substitute such values along with actuator requirement in a mathematical formula to work out the result correctly. The majority of persons involved with actuator installation cannot do this.

A fourth point is that if the installer is not skilled and careful, he may mount a hydraulic decelerator insecurely or in a misaligned position so that the impinging load applies a lateral load on the plunger. If this doesn't actually bend the plunger, it soon causes excessive wear on the plunger slide bearing and the hydraulic piston.

Because of the problems mentioned above, many years of development and testing work have been spent by applicant in an effort to construct a compact hydraulic decelerator with enough energy absorption capacity to be installed in both ends of pneumatic actuators to permit high operating speed. The restriction in space between the actuator piston rod and the inside of the actuator cylinder has been a major problem, as have leakage of the hydraulic fluid, tendency of the compressed air to enter the fluid and form bubbles, and overheating of the hydraulic fluid with consequent short life of the fluid seals.

SOLUTION OF PROBLEM

Described herein is the combination of a new type of hydraulic decelerative cartridge with mounting structures constructed for cooling the cartridge and adapted for general purpose use or attachable as heads to both ends of pneumatic actuators, and a new type of safety device which senses malfunction of a cartridge and stops operation of the actuator before damage can occur.

The improved hydraulic cartridge described is practical for use in the rod end head of a pneumatic actuator because it is so compact that its plunger can extend within the actuator cylinder while its adequately sized hydraulic cyinder is accommodated at one side of the actuator piston rod. The compactness is due to the combination of several features. First, the preferred plunger seal is a rolling diaphragm which is impervious to leakage of fluid or compressed air. The diaphragm is frictionless, it has only one convolution and contains a minimum amount of material. It therefore permits the plunger to move with minimum friction and inertia so it extrudes quickly and dependably by fluid pressure alone after each working stroke. No space is taken up by a plunger return spring. Second, the elastomeric type of bladder described is inherently elastic so that it maintains reserve pressure in the fluid sufficient to extrude the plunger without space being required for a spring to pressurized the fluid. Third, the bladder contributes a long working life to the diaphragm because the bladder has the characteristics of a low rate spring so that it maintains a moderate fluid pressure thoughout the full stroke of the hydraulic plunger to keep the diaphragm from wrinkling without being overstressed. To explain, as the plunger moves inward, the bladder expands to compensate for the fluid displaced and causes more unit tension in its own elastomer, but it raises the fluid pressure less than would be excessive for the diaphragm because of its accompanying decrease in wall thickness as it increases in diameter.

It is disclosed herein that an ordinary sliding type of plunger seal may also be used with the bladder instead of a diaphragm, but such use is recommended only for environments harmful to a thin diaphragm, and where gradual leakage of the fluid is acceptable.

The mounting structure which holds the cartridge assembled to a pneumatic actuator is an essential component in the actuator combination, not only for its supportive function but also because it is provided with special passageways for air flow so that the air supplied to the actuator automatically keeps the cartridge cool.

It is felt that the safety device described herein should also be considered an essential component of the actuator combination. Pneumatic actuators equipped at both ends with the new hydraulic decelerative cartridges will often be operated at more than twice the safe piston velocity of an ordinary actuator. To protect personnel and equipment in the event of malfunction of a cartridge, the safety device should be included to stop the actuator automatically if for any reason the actuator piston approaches the end of its stroke at a dangerous velocity.

SUMMARY

The present invention, by providing a means of safely incorporating automatically cooled hydraulic decelerators within both ends of a pneumatic actuator, more than doubles the permissible piston velocity and productive capacity of an actuator, thereby saving equipment, space, and supervisional labor. In addition, this improved combination:

1. Safeguards personnel and actuator.

2. Saves energy. Briefly explained, each decelerator converts to heat (within its fluid), all the energy it absorbs as it brings the air piston to a stop. The improved actuator head in which the cartridge is mounted is configurated to cause the compressed air supplied to operate the actuator, to flow past the cartridge to cool it, and in doing so the air is heated. The supplied air is thereby expanded according to Charles' law and the air compressor is required to furnish less compressed air to the actuator than would be necessary otherwise.

3. Permits an actuator and its load to operate at a lower noise level than a system where external decelerators are used, because the noise of the air piston striking the hydraulic plunger rod is muffled by being enclosed within the air cylinder.

4. Insures constancy of decelerative action by keeping the hydraulic fluid automatically cooled.

5. Lengthens the life of the dynamic seals of the decelerators by keeping the seals cool and protected from abrasive material and harmful chemicals which may exist exteriorly of the actuator.

6. Insures constant lubrication and permanent cleanliness of the decelerator plunger rods for long life when supply air to the pneumtic actuator is filtered and lubricated.

7. Eliminates possibility of damage to decelerators due to faulty installation. Perfect alignment of internal decelerator with air piston travel precludes possibility of bending of decelerator plunger rods and minimizes plunger rod side bearing wear.

8. Eliminates necessity for user or salesman to calculate decelerator requirements and to choose the proper decelerators, because those installed in each actuator can be pre-selected by the manufacturer for size and adjustment range to satisfy the requirements of any mechanism for which that particular actuator is scheduled to be used.

9. The self contained hydraulic cartridges described herein may be adjusted to suit varied load requirements and may be quickly replaced in event of malfunction or change of use of the pneumatic actuator.

DEFINITIONS

For brevity in the following description, the rolling semi-toroidal fold which connects adjacent invaginated walls of the rolling diaphragm will be called a "convolution". The words "power pulse" will indicate a transient variation in power created either by starting or stopping a flow of power. The words "power pulse conductor" will be taken to mean an element capable of transmitting electricity, air, heat, or sound. The word "switch" will be used to designate electric, fluidic, or any other type switch which when operated can transmit a power pulse to a responsive air valve. The word "bore" will be taken to mean a hole which may vary in diameter and may extend part way into or through one or more blocks of material that are held together. "Reserve pressure" will mean the pressure within the hydraulic fluid when the cartridge plunger is in its fully extended position.

DESCRIPTION OF PREFERRED EMBODIMENTS

First Species Of Hydraulic Cartridge

Figures 1, 2, 3, 4, 5, 6, 7, 8:
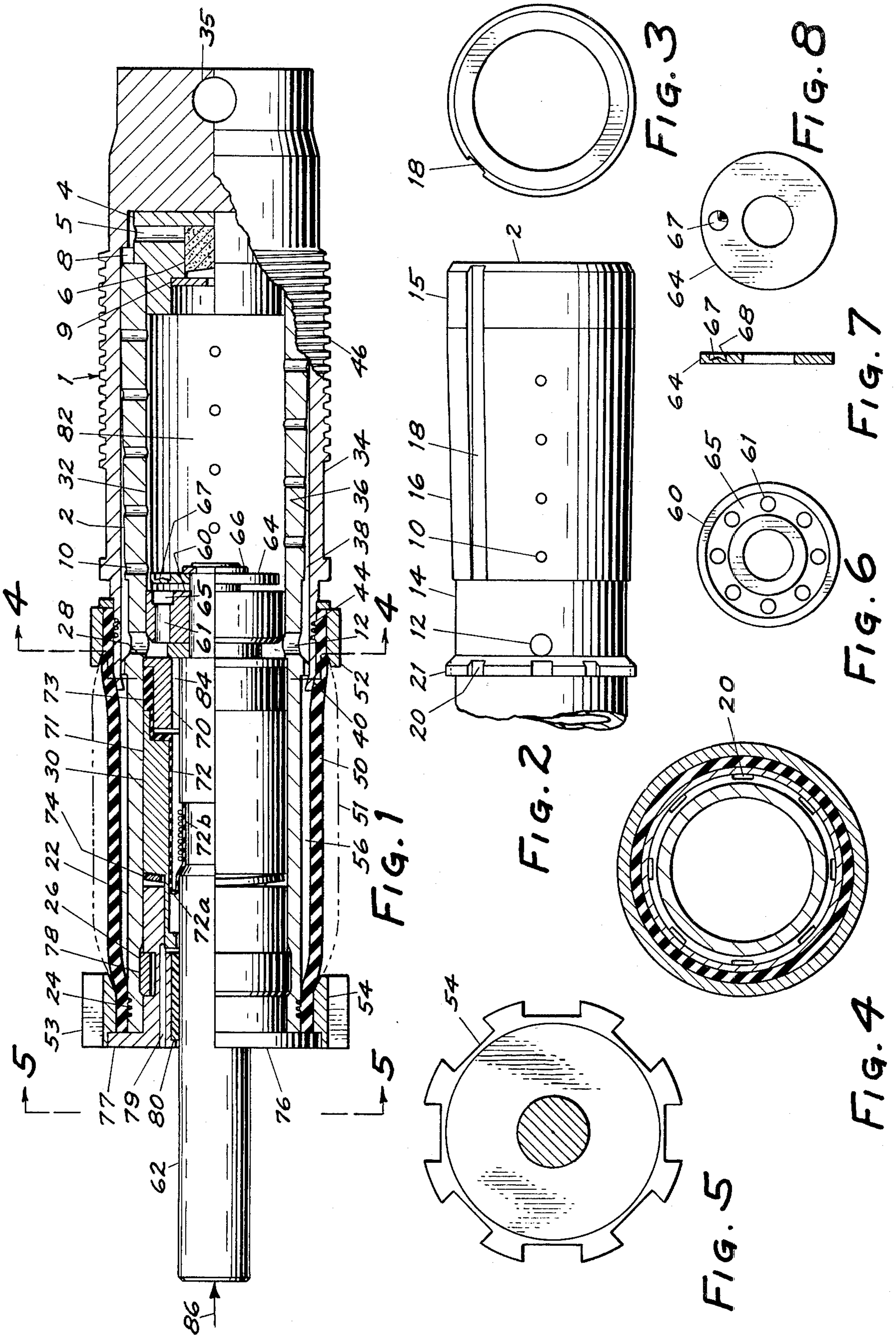
FIG. 1 is a substantially mid-sectional view of the first species of hydraulic decelerative cartridge of the present invention, the plunger being shown in its normally extended position at the start of a working stroke.
FIG. 2 is a fragmentary view of the cylinder of FIG. 1.
FIG. 3 is an end view of FIG. 2.
FIG. 4 is a transverse section on zigzag line 4—4 of FIG. 1, parts inside the cylinder being omitted.
FIG. 5 is an end view taken on line 5—5 of FIG. 1, showing the notches 54 in the periphery of the end clamp ring of the cartridge.
FIG. 6 is an end view of the piston per se of FIG. 1, showing the arrangement of ports 61 and the grooves 65 connecting them.
FIG. 7 is a mid-sectional view of the valve of FIG. 1, shown the shear disc 67.
FIG. 8 is an end view of the valve of FIG. 7.

In FIGS. 1-8, numeral 1 indicates a hydraulic decelerative cartridge made according to the present invention. A cylinder member 2 intrinsically open on both ends is shown closed at one end by a plug member 4 fitted tightly into the cylinder and containing a porous metal filter element 6. Radial holes 5 permit filtered fluid to enter space 8. A perforated filter cover 9 helps trap foreign particles arrested by the filter. FIGS. 1 and 2 show that the wall of the cylinder is provided with fluid metering ports 10, fluid re-entry ports 12, external reduced diameter portion 14, cylindrical portion 15, tapered portion 16, longitudinal groove 18, flow notches 20 interspaced with raised lands 21, and cylindrical neck portion 22 with labyrinthine grooves 24. Internally the cylinder has a circumferential groove 26, and two bores meeting at shoulder 28, bore 30 being slightly larger than bore 32.

Jacket

Surrounding a portion of the cylinder is a heat dissipating jacket member 34 having a cylindrical bore 36 surrounding the tapering cylinder wall and forming a tapering circumferential space 38. The jacket has a conical swaged portion 40 retaining it on the cylinder and touching the cylinder at circumferentially spaced lands 21 so as to form small fluid flow openings 20 seen in FIG. 4. The jacket is preferably provided with labyrinthine grooves at 44, and threads 46 which also act as cooling fins.

Bladder and Clamp Rings

Sealed to the jacket and to the cylinder is an elastomeric bladder seal 50 which can expand as indicated by phantom line 51 to compensate for changes in fluid temperature or fluid displaced by the plunger 62 as it moves inward. The bladder is fastened to the jacket and cylinder by clamp rings 52 and 53 pressed over the ends of the bladder 50 forcing it into labyrinthine grooves 24 and 44. Clamp ring 53 may be provided with notches 54 as shown in FIGS. 1 and 5 to permit air flow past the cartridge when it is installed in a pneumatic actuator as will be explained later herein. If environmental conditions and life expectancy permit use of a bladder material having a high degree of elasticity, then a bladder such as shown at 50 in FIG. 1 may be installed in a circumferentially stretched condition so that it exerts a squeezing action on the hydraulic fluid in chamber 56 to produce reserve pressure in all the fluid within the cartridge. This will be shown to be advantageous later herein.

Plunger Components

Mounted within the hydraulic cylinder is a hydraulic piston 60, hardened plunger rod 62, slidable check valve 64 retained by snap ring 66, a stationary flanged ring 70 positioned against shoulder 28, a tubular quill 71 and an elastomeric rolling diaphragm 72. The diaphragm has a single convolution **72*a*, an anchor bead 73 sealed between ring 70 and quill 71, an end anchor portion 72*b* sealed to the plunger rod, and a spring washer 74 to insure permanent sealing pressure of the quill against bead 73. A split snap ring 78 engaged in groove 26 retains a keeper 76 within the cylinder. The keeper has a flange portion 77 which retains clamp ring 53 in place, an air vent 79 which equalizes air pressure at convolution 72*a* with ambient air outside the unit, and a bearing bushing 80 which serves to guide the plunger rod. The piston divides the interior of the cylinder into a high pressure chamber 82 and low pressure chamber 84 and is provided with ports 61** which, due to fluid flow acting on the check valve, are automatically closed during working strokes, and open during retractive strokes.

In FIG. 6, the piston ports 61 are shown to be connected by a circular groove 65, and in FIGS. 7–8 valve 64 is shown provided with a shear disc 67, positioned radially aligned with groove 65 and integrally formed in the valve as the convex bottom of a counterbore 68. The shear disc is a protective feature which breaks out of the valve to protect the more expensive parts of the cartridge in case of a loss of fluid with consequent short deceleration stroke causing excessively high fluid pressure.

Principle of Deceleration

For drilling economy, the metering ports 10 are preferably all the same diameter, and to give maximum strength to the cylinder, are spaced circumferentially around the cylinder in several rows as indicated in FIG. 1. Ports 10 extend through the externally tapered surface 16 of the cylinder, those ports near the start stroke position of the piston thereby being spaced farther from the cylindrical bore surface 36 of the jacket than the ports near the end stroke position. By this means the start stroke resistance of the plunger can be arranged to be very light compared to its end resistance. This arrangement not only gives the quietest and smoothest stop to any load, but also permits an operator to adjust the decelerative action of the hydraulic cartridge by positioning the cartridge axially to utilize a smaller percentage of its stroke for light loads than for heavy loads, while retaining the desirable action of gentle deceleration for both types of loads. If tere is need for unusual start stroke resistance relative to end stroke resistance of the plunger, a taper with gradually varying slope from start stroke to end stroke can be provided on the cylinder. Tapering grooves or a multiple stepped external surface on the cylinder roughly equivalent to a taper may be provided if found more economical to manufacture.

Operation of Cartridge

FIG. 1 shows plunger rod 62 in its extended position at the start of a working stroke. When an external load is applied to the end of the rod as shown by arrow 86, the rod moves inward closing valve 64 so that the fluid within high pressure chamber 82 is pressurized creating resistance to decelerate the load. Fluid simultaneously flows from chamber 82 through metering ports 10, generating heat, then flows through space 38 and reentry ports 12 to enter the chamber above the piston. A part of the fluid flowing through space 38 passes flow notches 20 and expands bladder 50 to compensate for the fluid displaced by the plunger rod. Simultaneously a small percentage of fluid flows through the high resistance filter 6 out through radial holes 5 and through longitudinal groove 18 to return above the piston thru re-entry ports 12. After the external load at 86 is removed, the plunger rod is returned to is extended position by reserve pressure maintained in the fluid by circumferential tension in bladder 50, the fluid flows previously described then being reversed but very slow while check valve 64 opens to permit fast flow through piston ports 61 to enable the plunger rod to extend quickly.

jacket 34 is provided with wrenching means such as a hole at 35 for adjustment of the cartridge plunger stroke when the cartridge is supported by the threads at 46.

Second Species of Hydraulic Cartridge

Figure 9:
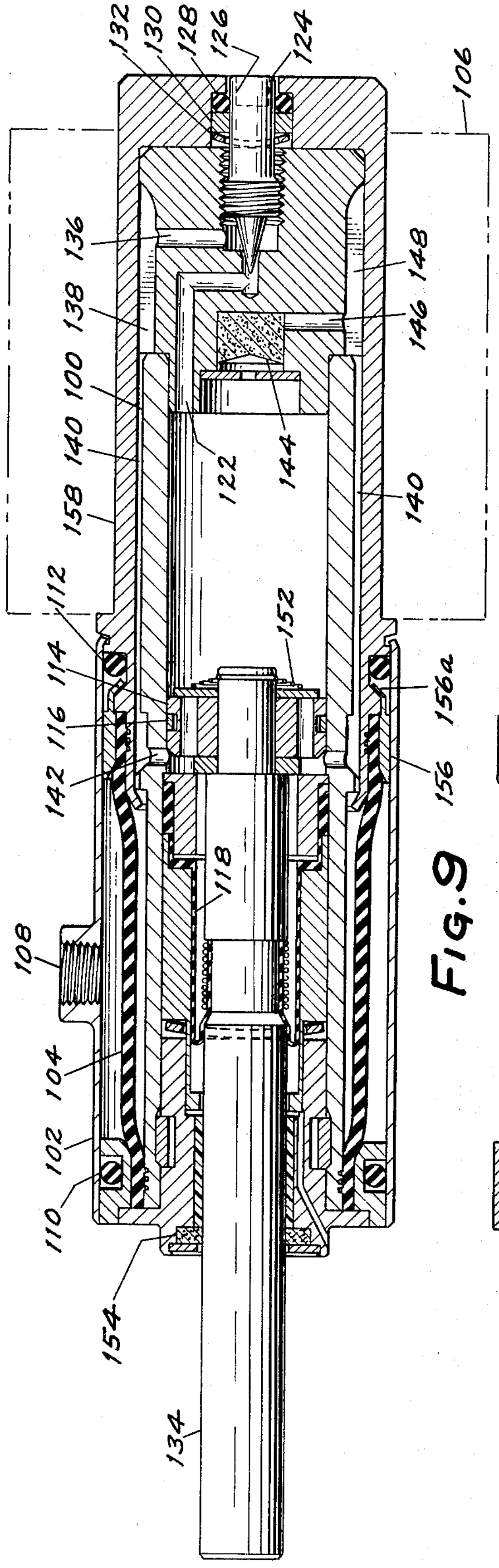
FIG. 9 is a mid-sectional view of a second species of hydraulic cartridge embodying this invention, a support block 106 being shown in phantom.
Figure 10:
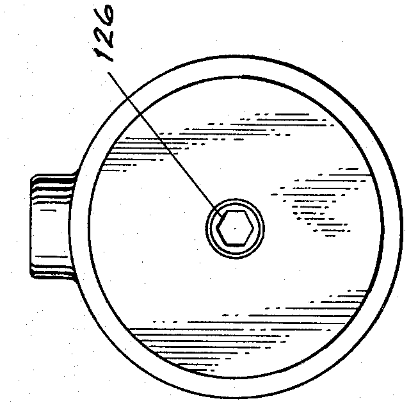
FIG. 10 is an end view of the cartridge of FIG. 9 showing the adjustable valve with wrench socket 126.

In the second species of cartridge shown in FIG. 9, the cylinder has an unperforated wall throughout the piston stroke range and an encasement structure 102 encloses bladder 104. The encasement prevents physical damage to the elastomeric material of the bladder where it extends outside of its support block 106. In addition, the encasement may be utilized to transform the cartridge into an inexpensive and efficient control for pneumatically operated tools such as drill presses used for peck drilling. As disclosed in U.S. Pat. No. 3,680,970, copy of which is enclosed, peck drilling requires that the drill bit be moved quickly to the work piece and decelerated, then be fed repeatedly into and out of the work, the hydraulic cartridge plunger controlling the feed only while the drill is cutting. The cartridge of FIG. 9 is capable of this action if the encasement is provided with air inlet port 108 and "0" rings 110 and 112, while the piston 114 is provided with a friction producing expandable split piston ring 116 and the bladder is arranged to have light tension to exert just enough reserve pressure in the fluid within the unit to keep the diaphragm 118 properly shaped and free of wrinkles, but not enough pressure to move the plunger against the frictional drag of ring 116. Air pressure supplied through port 108 by an automatic valve can then be utilized to extrude the cartridge plunger at the proper times as indicated in U.S. Pat. No. 3,680,970.

The use of an air pressurized encasement as described also permits use of a non-tensioned elastic bladder if conditions require use of a bladder material having poor elastic qualities.

Continuing with FIG. 9, an opening 122 by-passing filter 144 provides a passageway to a velocity regulating threaded needle valve 124 which is externally accessible for adjustment by means of hex socket 126 to regulate fluid flow through its seat. The needle valve is sealed with "0" ring 128, a pressure washer 130, and spring washer 132. The valve controls the velocity at which rod 134 and piston 114 can move so that the full stroke of the rod can be utilized for controlling velocity at a steady rate. Fluid passing the needle valve returns to the cylinder above the piston via passageway 136, slot 138, space 140, and re-entry ports 142. Fluid passing radially thru the filter 144 returns to the cylinder via passageways 146, slot 148, and space 140.

Other minor optional features of FIG. 9, are the valve spring 152 to maximize length of effective stroke of the plunger rod 134, rod wiper 154 to keep the rod clean, clamp ring 156 being swaged at 156a to hold it firmly to the jacket, and the smooth jacket exterior 158.

Third Species of Hydraulic Cartridge

Figure 11:
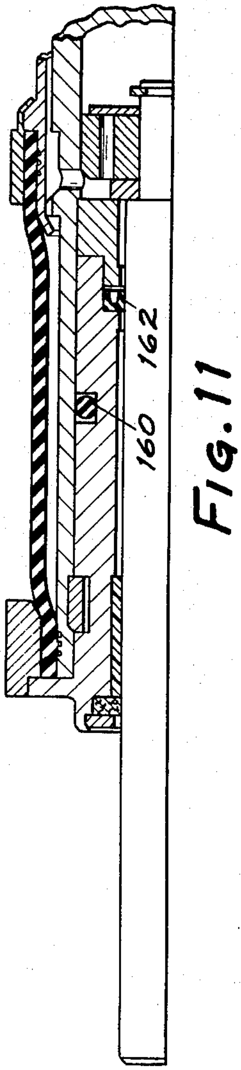
FIG. 11 is a fragmentary half sectional view of a third species of cartridge embodying this invention.

In some environments, a thin elastomeric diaphragm such as 118 in FIG. 9, is susceptible to deterioration by oils or aromatic fluids which can enter through the keeper vent or the plunger guide bushing. FIG. 11 shows part of a cartridge in half section made according to the present invention and rendered safe for use in such hostile environments by being equipped with an "0" ring 160 and an ordinary sliding seal 162 instead of a diaphragm. The seal shown is of the "U" packing type but could be any of the other types of close fitting sliding seals made of chemically resistant material. Sliding seals have higher friction than diaphragms and also leak slightly, but if usage is moderate, a practical length of service life can be expected before enough fluid leaks out to prevent full extrusion of the plunger by fluid pressure.

It is intended that the various features illustrated combined in FIGS. 1, 9 and 11 may be interchanged and recombined irrespective of the arrangement shown in the drawings. For example, the needle valve 124 of FIG. 9 may be combined with the ported cylinder of FIG. 1 to augment the load adjustment capability of thread 46. The valve spring 152 of FIG. 9 may be combined with the check valve of FIG. 1 to add slightly to the working stroke of the piston.

Special Bladders

Figure 13:
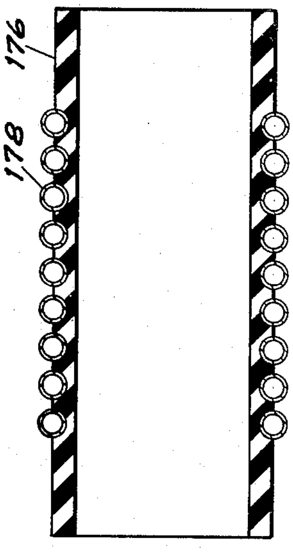
FIG. 13 is a mid-sectional view of a bladder encircled by garter springs and optionally usable as a component of this invention.
Figure 12:
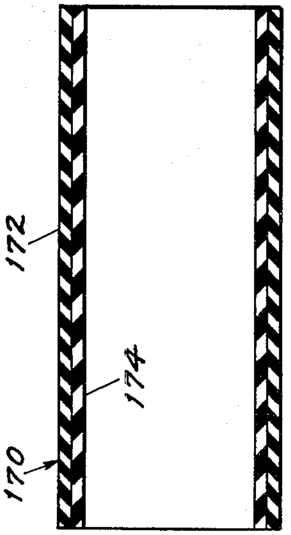
FIG. 12 is a mid-sectional view of a double walled bladder optionally usable as a component of this invention.

FIGS. 12-13 show two types of bladder, either one of which may be applied to the hydraulic cartridge instead of the type shown in FIG. 9. In FIG. 12, numeral 170 indicates a double walled elastomeric bladder consisting of outer wall 172 which may be made of environmentally resistive material, and an inner wall 174 having the necessary resistance to swelling by the hydraulic fluid. One or both walls could furnish squeezing action on the hydraulic fluid necessary to extend the cartridge plunger. FIG. 13 illustrates a bladder which will reliably maintain the fluid reserve pressure for an indefinitely long time. It comprises a grooved wall elastomer 176 encircled by metal garter springs 178. It has been found by trial that the bladder and springs expand and contract without abrasive wear between them. However, the expense of providing and installing such a bladder must be justified by a requirement for an unusually long life of fluid reserve pressure.

Cartridge With Cooling Feature

Figure 14:
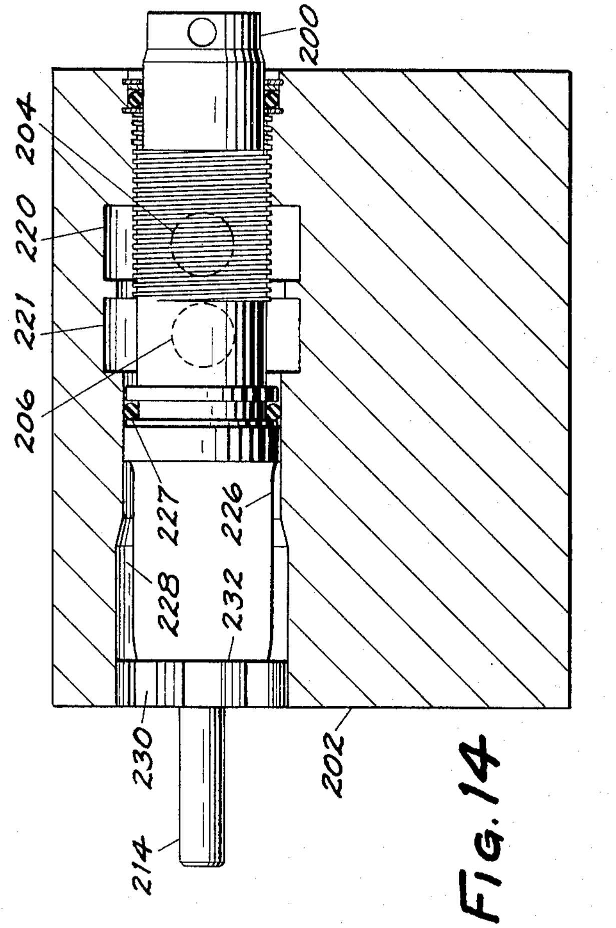
FIG. 14 is a mid-sectional view of a cartridge mounted for general purpose use, the mounting block 202 incorporating passageways for forced air cooling for the cartridge, numeral 204 indicating in phantom the location of passageway 204 of FIG. 15.
Figure 15:
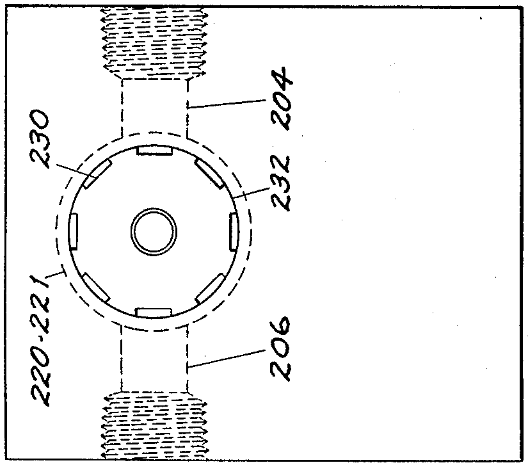
FIG. 15 is an end view of FIG. 14.
Figure 16:
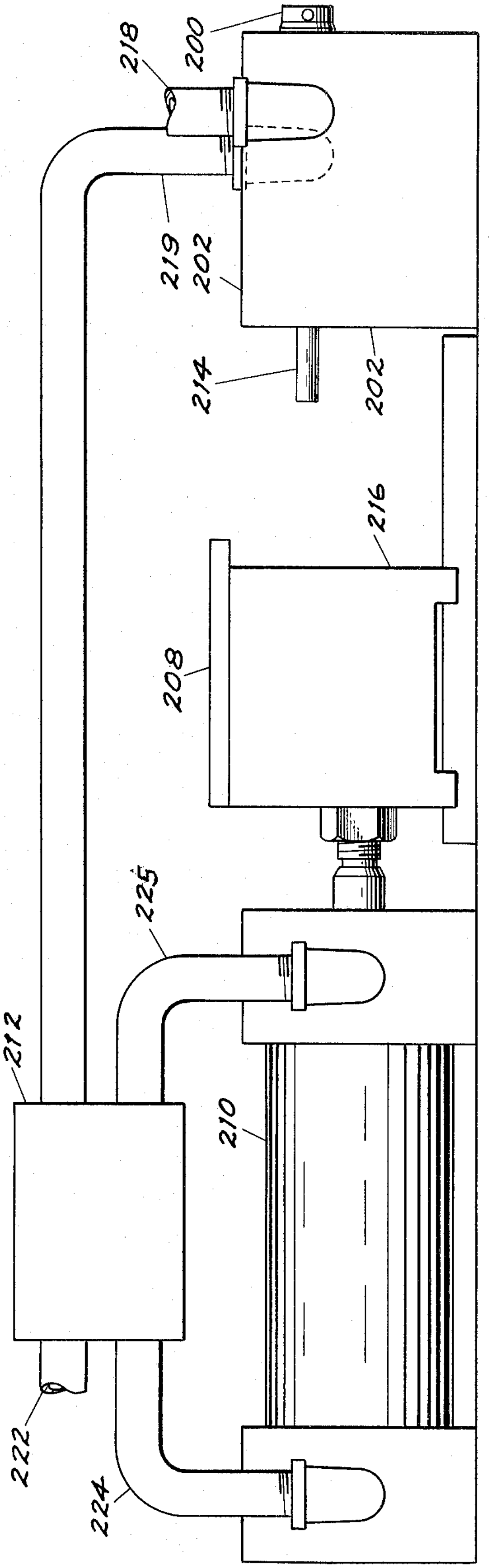
FIG. 16 is an elevational diagrammatic view of the cartridge 200 of FIG. 14, positioned to control the motion of a mechanism 208 operated by a remote pneumatic actuator.

It was mentioned earlier, that a hydraulic decelerative cartridge becomes overheated if operated continually. The overheating problem may be eliminated as shown in FIGS. 14-16 wherein cartridge 200 is supported by a mounting block 202 which contains passageways 204 and 206 and annular passages 220 and 221 to lead air flow around the cartridge body for cooling purposes. The combination shown is for general purpose use in decelerating any moderate duty moving mechanism 208 operated by a pneumatic actuator 210 controlled by a remote valve 212. To accomplish its purpose the mounting block 202 is secured in position with plunger 214 of the cartridge extending into the stroke range of the moving mechanism so that surface 216 of the moving load strikes plunger 214. With pipe connections as shown, the supplied compressed air enters block 202 through pipe 218, is heated as it flows past the cartridge via passageways 204, 220, 221 and 206, exits from the block through pipe 219 flows alternately through pipes 224 and 225 to operate the actuator and exhausts from the valve through pipe 222. A less efficient arrangement, which omits heating the supplied air, results if the air flow is reversed to pass through block 202 last. In the arrangement of FIGS. 14-16 the cartridge is installed from the left side of the mounting block and compressed air is kept from leaking past bladder 226 by an "O" ring seal 227, the bladder chamber 228 being vented by notches 230 in the cartridge clamping ring 232 to permit ambient air to enter or leave chamber 228 as the bladder expands and contracts. The arrangement shown is not the most efficient possible because only a portion of the cartridge body is exposed to the flow of cooling air. However, additional cooling is provided to the cartridge by metal to metal heat conduction into block 202 which is also cooled by air flow.

Actuator With Automatic Cooling

FIGS. 17-20 show several decelerative cartridges 300, 302, 304, 306, and a dummy cartridge 308 combined with mounting structure forming heads 310 and 312 attached to a pneumatic actuator cylinder 314 and providing automatic cooling of the cartridges. Two (or more) cartridges in each actuator head improve the cooling action due to the increased cooled surface they provide; they also permit the actuator to operate efficiently with heavier loads and/or higher air pressure, and also provide an obvious safety feature. If one decelerator should malfunction, the adjacent one will prevent excessive impact of the air piston 316 against head 310 or 312 even though the active cartridge may be temporarily overloaded until the failed cartridge can be replaced.

The dummy cartridge 308 has no functioning parts. It is substantially solid and shaped approximately like the exterior of a working cartridge. It is utilized only to form sealed plug means to prevent the escape of air from the cylinder in the event no working cartridge is installed in a cartridge position. It may contain an air vent 311 which permits air flow to and from cylinder 314 similar to that permitted by an active cartridge.

Figure 17:
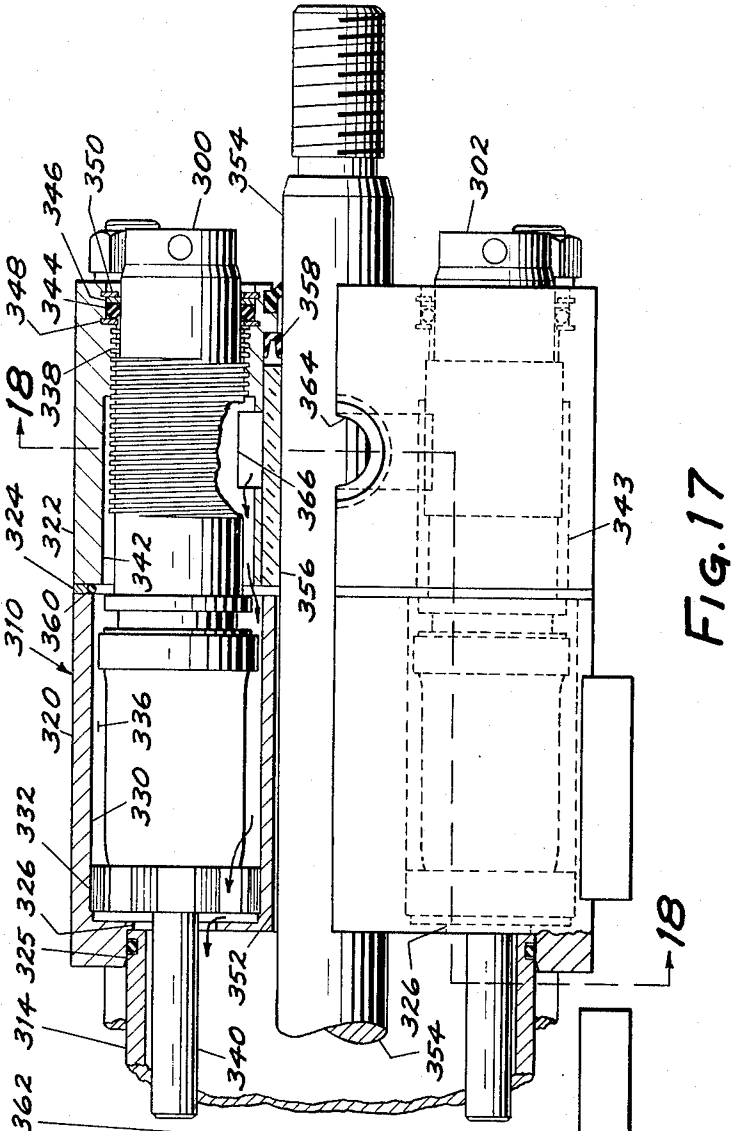
FIG. 17 is a half mid-sectional view of the rod-end head of a pneumatic actuator, the single head comprising two blocks equipped with two of the new, hydraulic decelerative cartridges.
Figure 18:
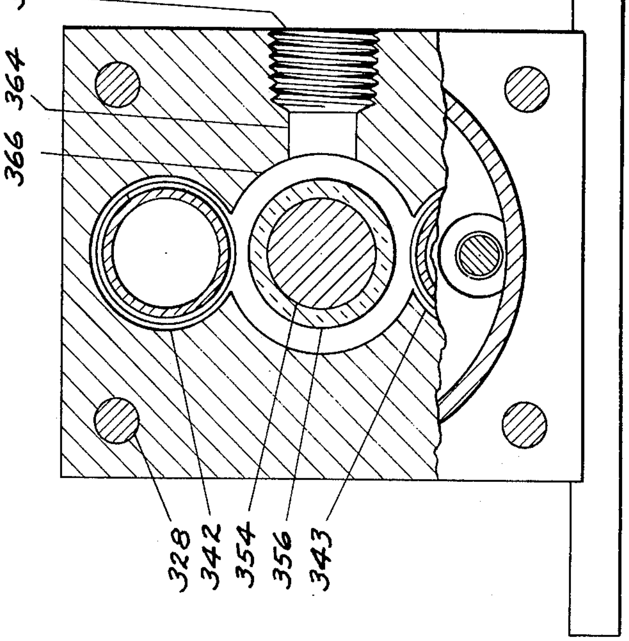
FIG. 18 is a partial section taken on zigzag line 18—18 of FIG. 17, parts inside the cartridge cylinder being omitted.
Figure 19:
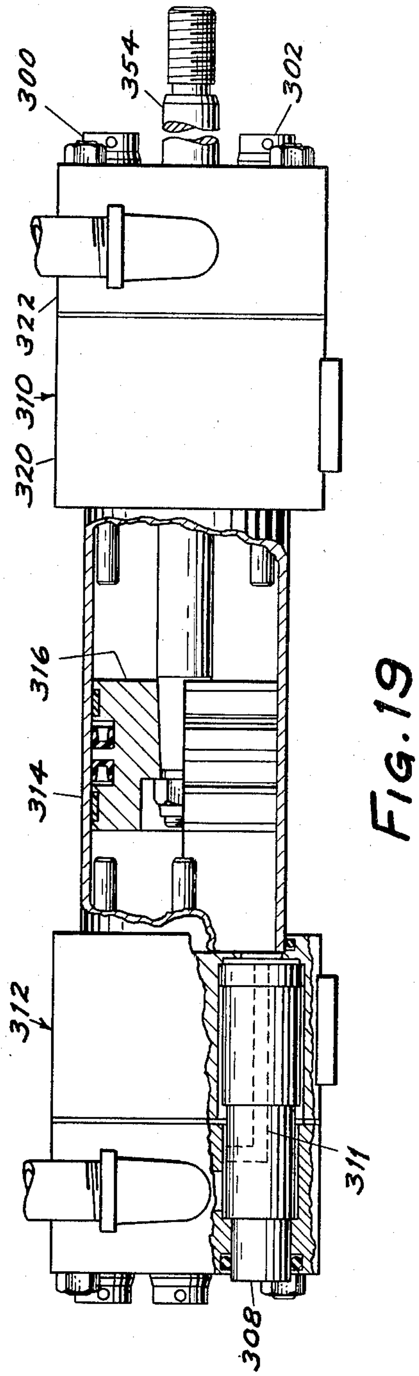
FIG. 19 is a partially sectionalized elevation of a pneumatic actuator equipped with four of the new hydraulic cartridges and one dummy cartridge.
Figure 20:
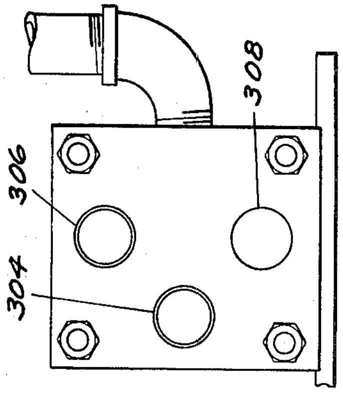
FIG. 20 is an end view of FIG. 19.

Referring to FIG. 17, the mounting structure comprises primary block 320 with secondary block 322 and gasket plate 324. The two blocks must be separated to allow installation of the cartridges shown in FIG. 17 as will be explained presently. Primary block 320 is counterbored at 325 to receive the end of air cylinder 314. Four tie rods 328 hold the actuator assembled. Bore 330 supports the notched clamp ring 332 of the cartridge, which is similar to ring 53 of FIG. 1. The bore clears the remainder of the cartridge to form a passageway 336 for air flow. Secondary block 322 is provided with female thread 338 which supports the threaded portion of cartridge 300 and provides a means of adjusting the position of the cartridge axially to vary the working stroke of plunger rod 340. Thus may the decelerative action be conformed to the particular air pressure and load under which the pneumatic actuator is operating. Referring again to FIG. 17, bore 342 clears the cartridge and forms a continuation of passageway 336 for air flow nearly full length of the cartridge, "O" ring seal 344 with backup washer 346 being provided between two snap rings 348 and 350 to prevent the escape of compressed air and to provide friction to keep the cartridge from rotating and changing its adjustment. Bore 352 accommodates air piston rod 354 which extends through a standard type of bushing 356 and "U" packing seal 358. Gasket plate 324 supports a peripheral elastomeric seal 360 between blocks 320 and 322 to prevent the escape of air. Secondary block 322 is shown in FIG. 18 to have a threaded port 362 leading into a bore 364. Compressed air supplied through bore 364 enters an annular passageway 366 which surrounds bushing 356 and communicates with bores 342 and 343. The compressed air is thereby led as shown by the arrows to flow at high speed completely around the cartridges and out through the notches in clamp rings 332 and openings 326 to enter the air cylinder 314 around the plunger rods during a power stroke. During the subsequent exhaust stroke, exhaust air is made to flow in the reverse direction completely around the cartridge and out through the port 362. The rush of air past each hydraulic cartridge and its plunger in both directions provides highly efficient cooling of the cartridge and the plunger.

Increase of Efficiency

Automatic cooling of the cartridges not only lengthens cartridge life also increases efficiency for the entire working system because all of the compressed air supplied by the compressor is heated as it passes the cartridges and expands in volume according to Charles' law before it enters the air cylinder. Therefore any certain amount of work done by the actuator of FIG. 17 requires a smaller volume of air to be delivered by the compressor than the same amount of work would require if done by an actuator without cooled decelerators.

Actuator With Eccentric Piston Rod

An actuator head made up of two blocks which are separable as in FIG. 17 permits installing the type of cartridge shown in FIG. 17, the cartridge being smaller in diameter at the threads than at the bladder end. This arrangement gives maximum possible radial space for the piston rod and its bushing and seal which are concentric with the air cylinder. However, the piston rod is limited in diameter and this is a disadvantage if an unusually long stroke is required for the actuator because then an oversize piston rod must be used for greater columnar strength.

Figure 21:
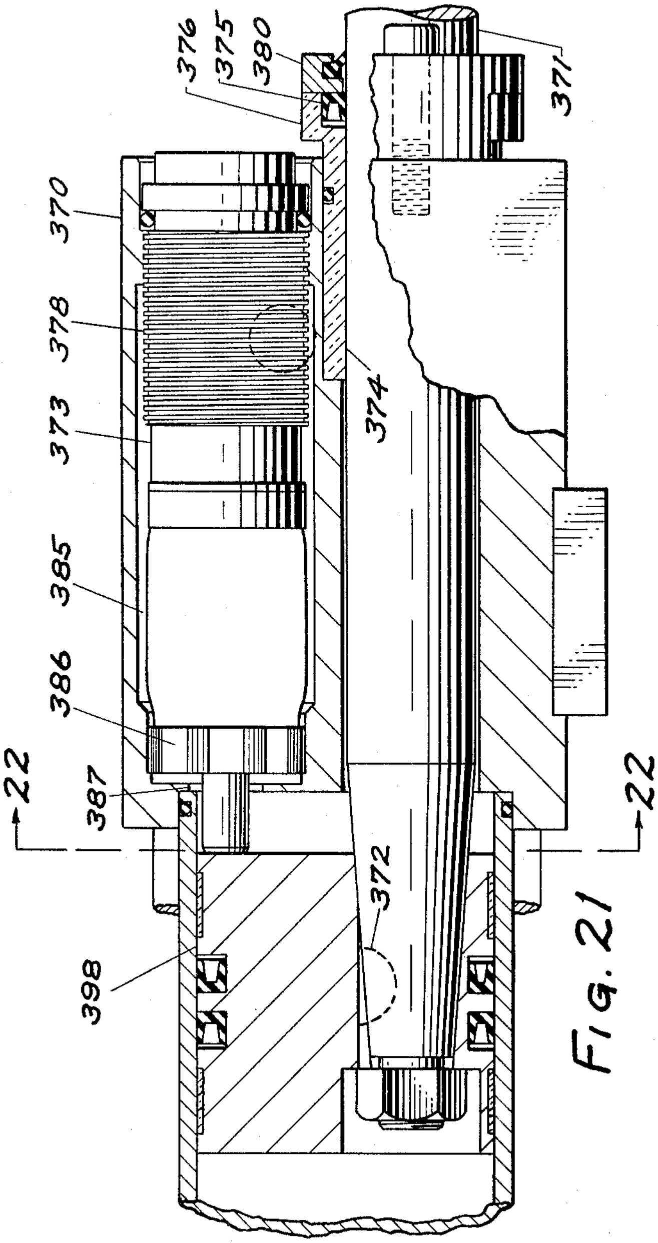
FIG. 21 is a partially sectionalized elevation of the rod-end head of a smaller sized pneumatic actuator, with an oversize piston rod positioned eccentric to the air cylinder to make room for the oversize rod and a relatively large cartridge.
Figure 23:
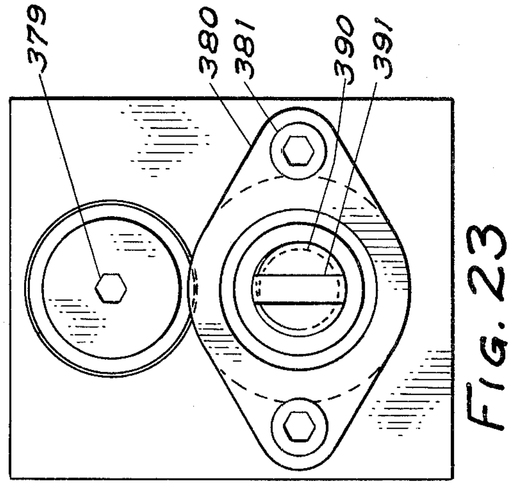
FIG. 23 is an end view of FIG. 21 showing a threaded end on the piston rod.
Figure 22:
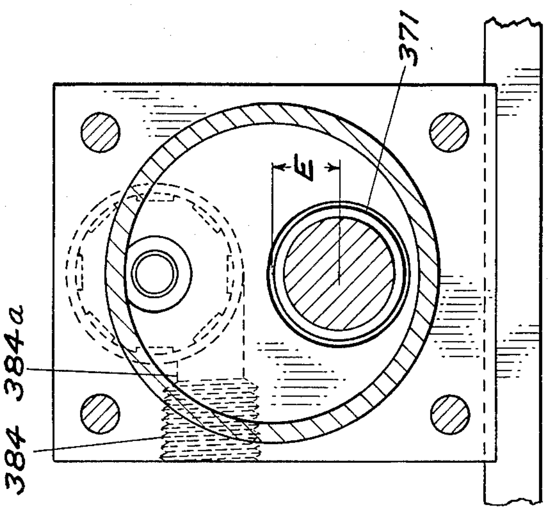
FIG. 22 is a transverse section on line 22—22 of FIG. 21.

FIGS. 21-23 show a one piece actuator head 370 with an oversize piston rod 371 keyed to the piston at 372 and positioned eccentrically to the air cylinder an amount "E" to give radial room for the oversize piston rod and for a relatively oversize decelerative cartridge 373, the air cylinder diameter being smaller than that of FIG. 17. Rod bushing 374 carries seal 375 outside of the head block and is provided with a flange 376 which incidentally limits the range of axial adjustment of the cartridge provided by threads 378 and hex socket 379. The bushing is removable, being held in place by a partially enshrounding retainer 380 and screws 381. The cartridge of FIG. 21 has a thread larger in diameter than the bladder end so it can be installed from the outer end of the block if bushing 374 is first removed. Provision for cooling the cartridge is the same as explained for FIG. 17, compressed air being led to flow past the cartridge via inlet port 384, passageways 384*a* and 385, and notches in clamp ring 386 and opening 387. It will be seen that more than one cartridge could be installed in the head of FIGS. 21-23, also that if the actuator piston rod were concentric, the one piece head could be constructed to accommodate the same type of cartridge as in FIG. 21, but the cartridge would be limited to a smaller size.

Figure 24:
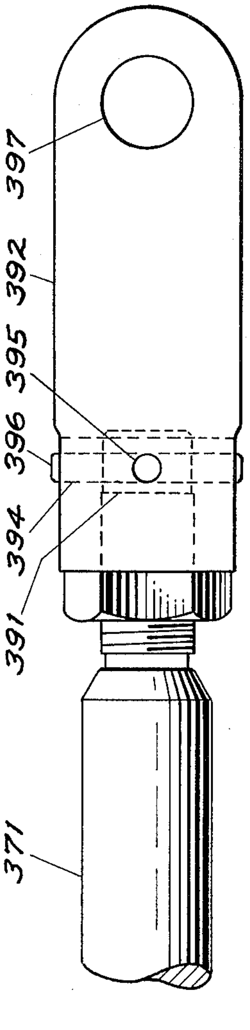
FIG. 24 is a fragmentary elevational view of FIG. 23 showing a clevis attached to the piston rod.
Figure 26:
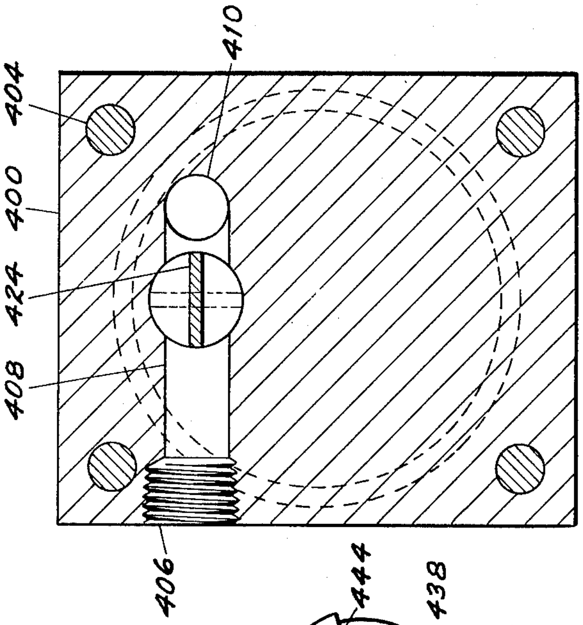
FIG. 26 is a transverse section on line 26—26 of FIG. 25.
Figure 29:
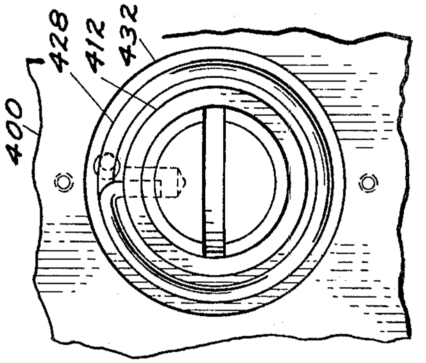
FIG. 29 is an end view of FIG. 27 with the end plate 430 removed to show the torsion spring 428.
Figure 28:
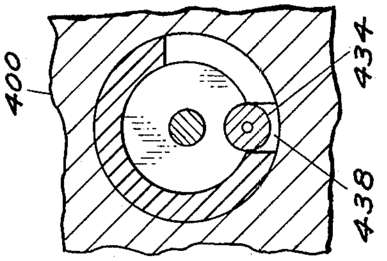
FIG. 28 is a fragmentary transverse section on line 28—28 of FIG. 27 showing how the latch pin 434 engages notch 438.

FIG. 23 is a view of the right end of the head of FIG. 21 showing a threaded end on the piston rod at 390 provided with a diametric slot 391 aligned with the direction "E" of the eccentricity of the piston rod relative to the air cylinder. FIG. 24 illustrates a mating clevis 392 provided with two holes 394 and 395. A pin 396 can be inserted in either hole through rod slot 391 to insure that the axis of clevis hole 397 is parallel or perpendicular to the eccentricity of the piston rod. The installer therefore has visual means of keeping piston 398 in its properly indexed free-sliding position relative to its eccentricity with the air cylinder.

THE SAFETY DEVICE

First Species

As mentioned earlier, any reciprocative mechanism moved by a pneumatic actuator can unintentionally be operated at piston velocities high enough to cause destructive impact at the ends of the stroke. The new safety device shown in FIGS. 25–44 prevents this.

Figure 25:
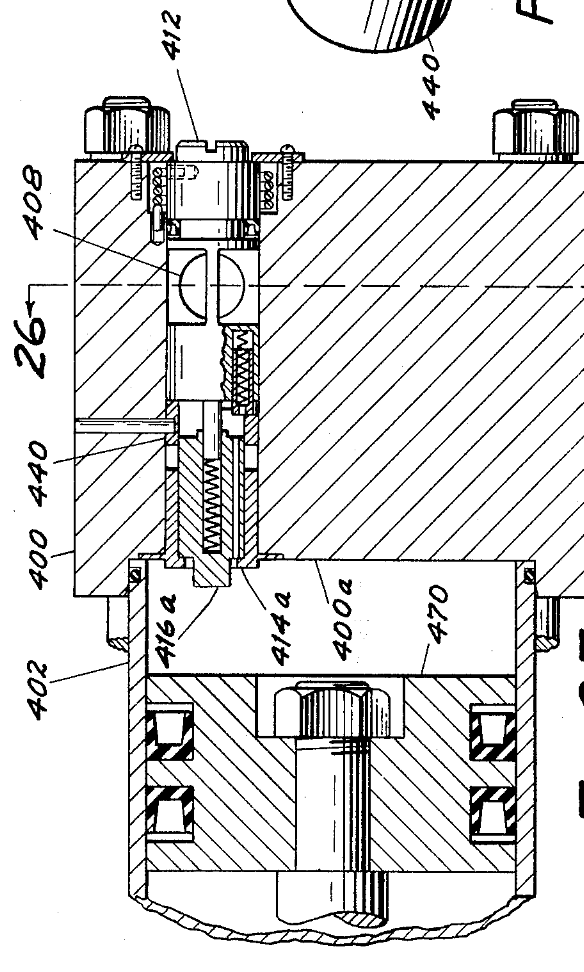
FIG. 25 is a fragmentary mid-sectional view of the rear end head of a pneumatic actuator equipped with the first species of safety device of the present invention.
Figure 27:
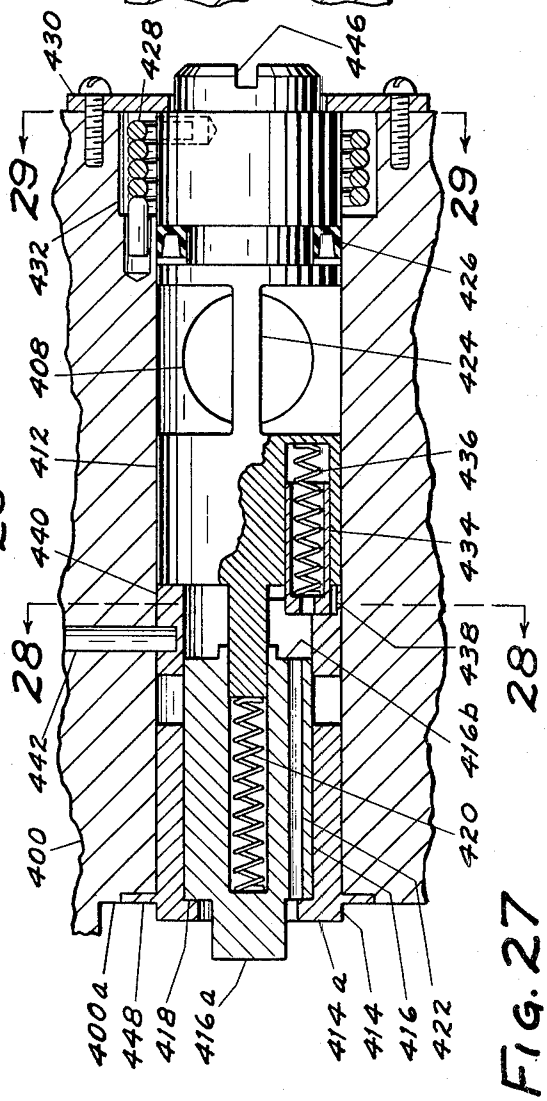
FIG. 27 is a fragmentary enlarged sectional view of the safety device of FIG. 25.

The assemblage of parts comprising the first species is shown in FIG. 25 retained in working relationship within a rear head block 400 attached to a pneumatic actuator cylinder 402 by tie rods 404 and having an inlet port 406 and air passageways 408 and 410 leading into the actuator cylinder. FIG. 27 is an enlarged view of the safety device which is shown to include rotatable spool 412 positioned within passageway 408 and adapted to automatically shut off the air supply to prevent damage to the actuator in the event of just one fast approach of the air piston 470 close to stop surface 414*a* of the shear bushing 414. Associated with the spool is a slidable hammer member 416 which is continuously urged toward a retaining shoulder 418 by a spring 420. The hammer is provided with an air vent passage 422 so that it may move freely against the action of the spring. The hammer head projects beyond surface 414*a* of the bushing so that each time the air piston approaches the end of its stroke at moderate velocity, the hammer head is depresssed just until its end surface 416*a* is even with surface 414*a*.

Figure 30:
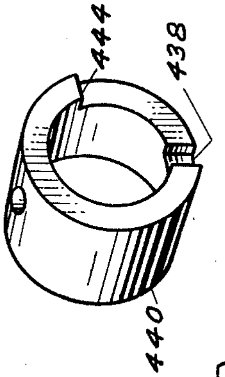
FIG. 30 is a perspective view of the notched ring 440 of FIG. 25.

The rotatable spool 412 has a shutoff web 424 and is provided with an elastomeric seal 426 to prevent escape of air. The spool is continuously urged by torsion spring 428 to rotate counterclockwise when viewed as in FIG. 29. The spool is retained axially between plate 430 and stepped ring 440 and one end carries an axially slidable latch pin 434 urged by a light spring 436 into contact with the bottom of notch 438 provided in ring 440. The ring is secured in place by pin 442 and as seen in FIG. 30 is provided with step 444 to limit rotation of the spool to 90°. The spool has a screw driver slot 446 accessible outside of the head block so an operator can rotate the spool against the action of spring 428 until pin 434 latches into notch 438, web 424 then being aligned to permit air flow through passageways 408 and 410 into the cylinder 402. While engaged in the notch, latch pin 434 extends into the stroke path of hammer member 416 and is disengageable from the notch by the end 416*b* of the hammer member if the hammer end surface 416*a* should be depressed below surface 414*a* of bushing 414.

Operation of First Species of Safety Device

A pneumatic actuator equipped with the safety device of FIGS. 25–30 would be operated so that the air piston 470 stopped against shear bushing surface 414*a* with light impact at the end of each stroke, depressing the hammer head only until its end surface 416*a* is even with surface 414*a*. However, in the event the air piston approaches the end of its stroke traveling at high velocity, it strikes the hammer head with abnormally high impact and causes the hammer head to travel below surface 414*a* due to its inertia. When this occurs, hammer end 416*b* strikes latch pin 434, disengages it from notch 438 and permits spool 412 to rotate 90° under the actuation of torsion spring 428 until the latch pin strikes shoulder 444. Web 424 then is in its phantom position of FIG. 26 so that it restricts the flow of supply and exhaust air through passageway 408 greatly reducing or stopping movement of the air piston in both directions. To insure reliability of operation, spool 412 should be a loose fit in the head block, although when in its "closed" position, a small amount of compressed air will continue to flow and allow very slow cycling of the actuator.

A user, experiencing a shut-down of his pneumatic actuator due to action of the safety device of FIG. 25, can resume operation by repairing the defect causing stoppage and resetting the device with a screw driver.

Figure 31:
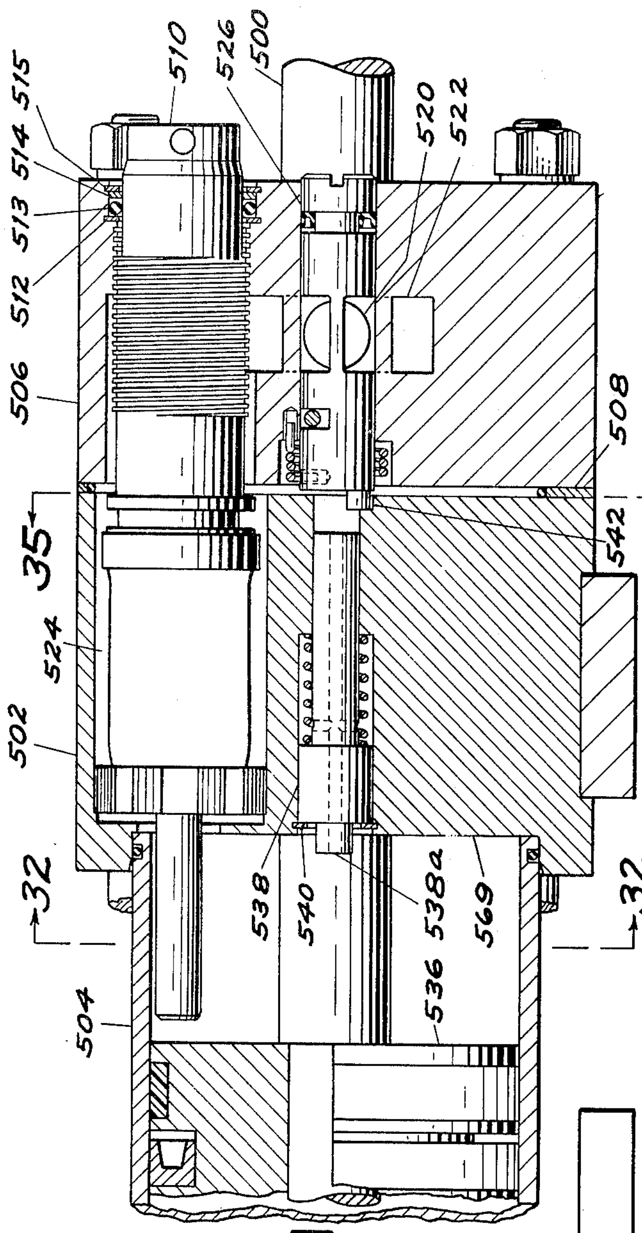
FIG. 31 is a fragmentary mid-sectional view of the rod end head of a pneumatic actuator, the single head comprising two blocks equipped with one of the new hydraulic cartridges and the second species of safety device of this invention, taken on zigzag line 31—31 of FIG. 32 and including an end portion of the actuator piston.
Figure 36:
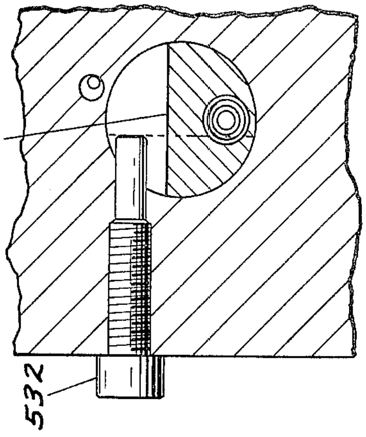
FIG. 36 is a fragmentary sectional view on line 36—36 of FIG. 33 showing how the double purpose screw 532 limits rotation of the spool.
Figure 32:
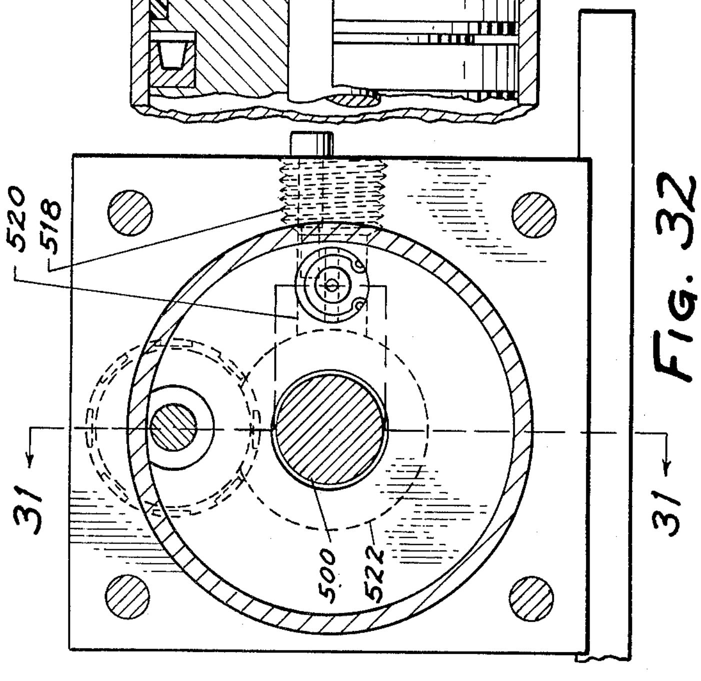
FIG. 32 is a partial section on line 32—32 of FIG. 31.

The shear bushing 414 is a redundant safety feature of the safety device and will usually be omitted as shown in FIGS. 31–32 where the stop surface 569 for the actuator piston is provided by the head block itself. Bushing 414 insures operation of the safety device under very unusual working conditions where hammer 416 might become immovably lodged in its depressed position due to sludge or corrosion. In such case if piston 470 strikes surface 414*a* at excessively high speed, flange 448 will shear and permit bushing end 414*a* to be pushed in even with surface 400*a*, thereby forcing the hammer to disengage the latch pin.

Second Species of Safety Device

FIG. 31 shows a two part rod end head for an actuator including the combination of a single decelerative cartridge with the safety device, the head structure being provided with air passageways for cooling the cartridge. The rear head for the actuator would be essentially the same except that provision for the air piston rod 500 would be omitted.

Figure 33:
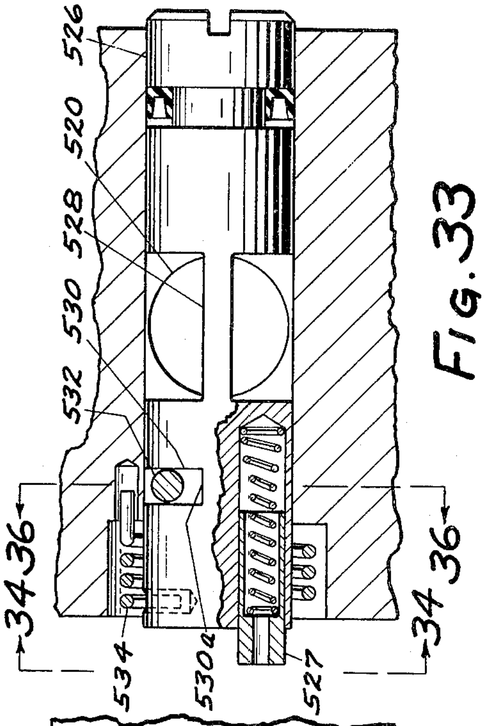
FIG. 33 is a fragmentary enlarged sectional view of the spool portion of the safety device of FIG. 31.
Figure 34:
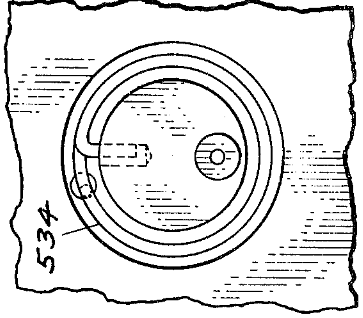
FIG. 34 is a fragmentary end view on line 34—34 of FIG. 33 showing the torsion spring 534.
Figure 35:
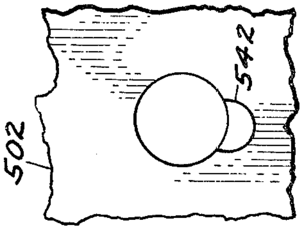
FIG. 35 is a fragmentary view on line 35—35 of FIG. 31 showing the notch 542 cut into primary block 502.

Referring to FIGS. 31–33, the actuator head comprises a primary block 502 assembled to air cylinder 504 with secondary block 506 and gasket plate 508 supporting cartridge 510 with seal parts 512–515 similar to FIG. 17. The blocks contain air inlet 518 and passageways 520, 522, and 524 so supply air flows around the cartridge for cooling. The safety device spool is provided with latch pin 527 and web 528 arranged to control air flow through passageway 520. Notch 530 in the spool is engaged by screw 532 to retain the spool axially and to limit its rotation by contacting surface 530*a* of the notch when in the phantom line position of FIG. 36. Torsion spring 534 is located at the latching end of the spool and rotates the spool clockwise as seen in FIG. 34 tointerrupt air flow if triggered by excessive impact of air piston 536 against the end 538*a* of hammer 538. The hammer is retained inexpensively by snap ring 540 instead of a shear bushing as in FIG. 25. The notch 542 arranged for engagement by the latch pin is formed in the primary head block 502 as shown in FIG. 35.

Figure 37:
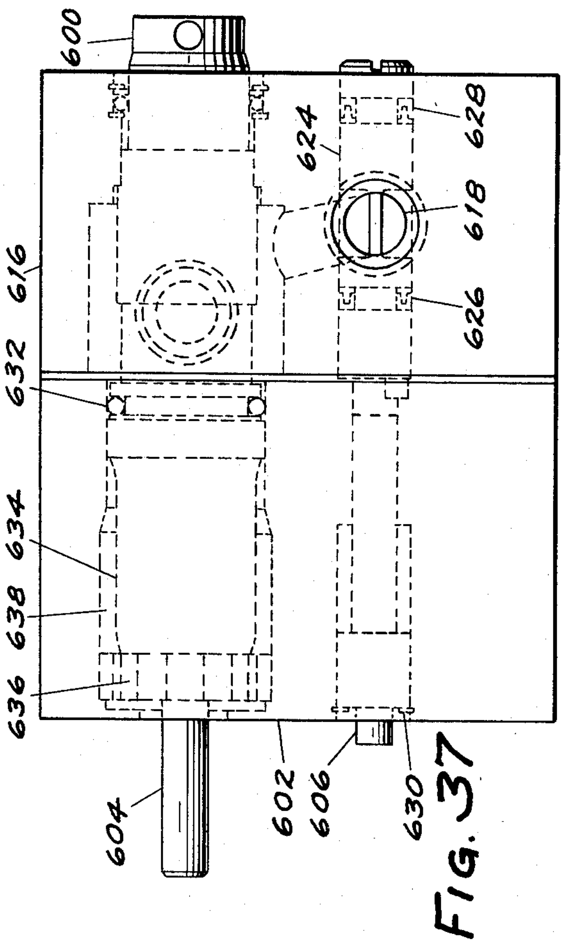
FIG. 37 is an elevational view of a hydraulic cartridge and the second species of safety device of the present invention mounted in a two-block structure for general purpose use.
Figure 38:
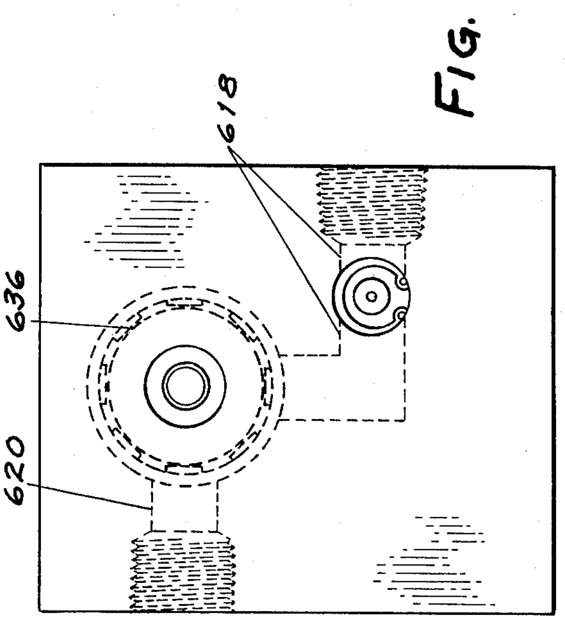
FIG. 38 is an end view of FIG. 37 showing the dotted air passageways for cooling the cartridge.
Figure 39:
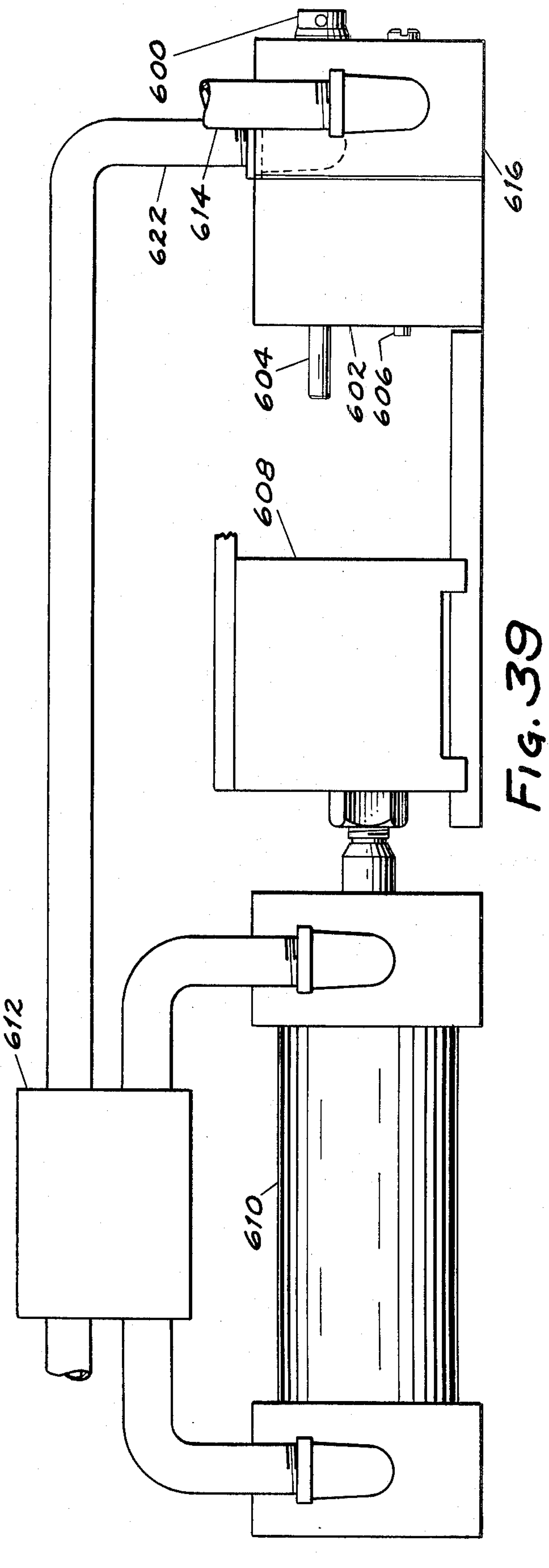
FIG. 39 is an elevational diagrammatic view of the device of FIG. 37 arranged to control the motion of a mechanism 608 operated by a remote pneumatic actuator.

In FIGS. 37–39 the second species of safety device (with one additional fluid seal 626) is shown diagrammatically combined with a hydraulic decelerator for general purpose use, the safety device providing the same protection as when installed within a pneumatic actuator. In this arrangement the mounting structure is shown to include two blocks for holding the decelerator, the primary block 602 being positioned so that hydraulic cartridge plunger 604 and hammer 606 can be actuated by surface 608 of a mechanism moved by a pneumatic actuator 610, the actuator being operated by a remote valve 612. The compressed air supplied first passes through pipe 614 then through secondary block 616 via passageways 618 and 620 to cool cartridge 600, then on to the valve through pipe 622, the safety device being positioned to interrupt air flow through passageway 618 if triggered by excessive impact from surface 608. In this case, spool 624 is the same as spool 526 of FIG. 33 except that it carries one additional elastomeric seal 626 to prevent escape of air entering through passageway 618. Hammer 606 is retained by snap ring 630 and operates the same as hammer 538 of FIG. 31. Cartridge 600 is provided with an "O" ring seal at 632 to prevent supply air from escaping past bladder 634, while notches 636 serve only to vent the bladder chamber 638 to atmosphere.

It will be seen that the safety device of FIGS. 37-39 combined with the mounting structure containing air passageways could be used alone without the decelerative cartridge if the user so desired. With that arrangement, air piston velocity of the actuator would normally be regulated by regulating the flow of supply or exhaust air, or by using an external decelerator. In any case, the safety device would stop movement of the mechanism if it approached the end of its stroke at excessive velocity.

Third Species of Safety Device

Figures 40, 41:
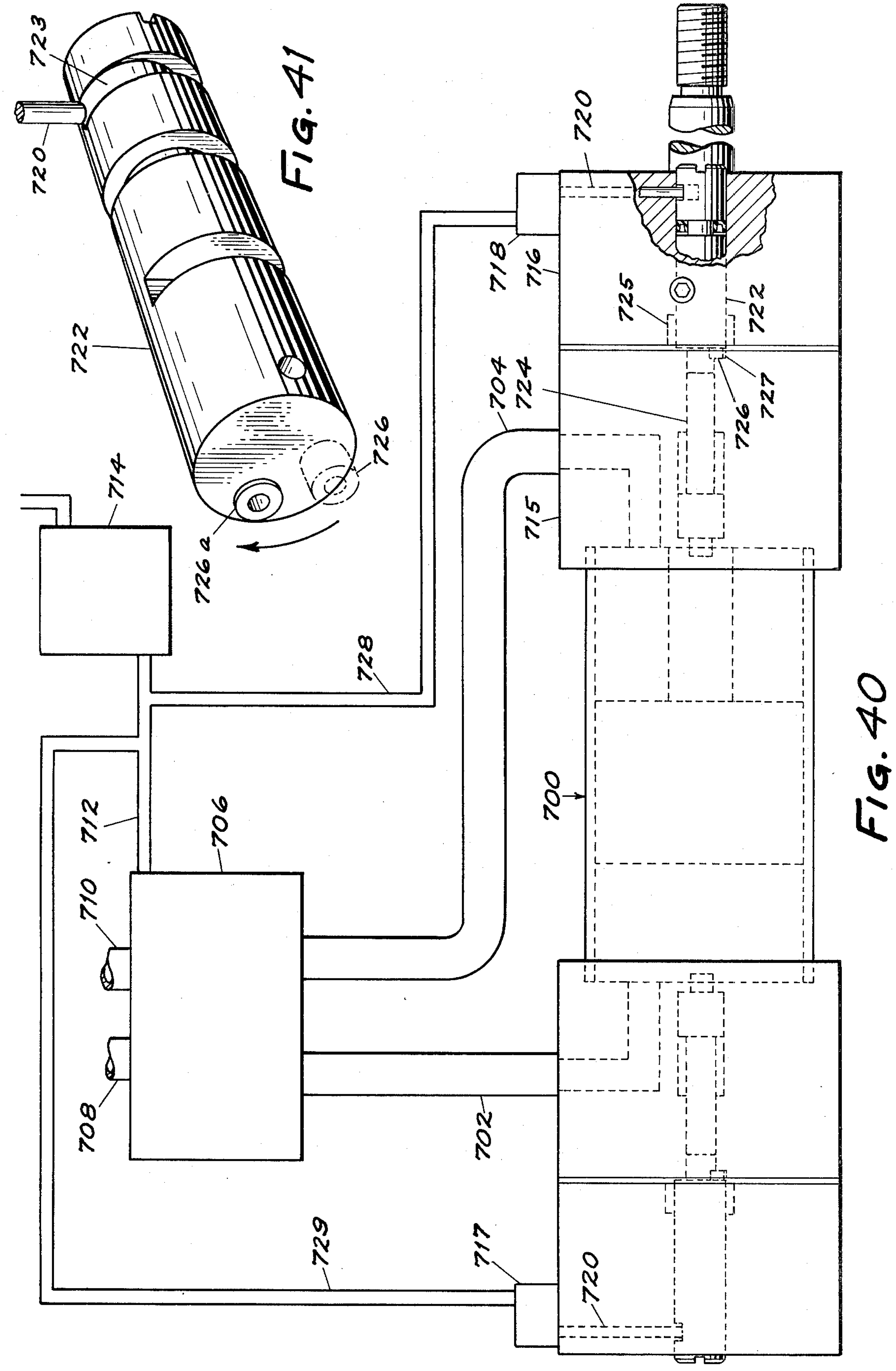
FIG. 40 is an elevational diagrammatic view of a pneumatic actuator equipped at both ends with a third species of the safety device of the present invention and operated by a remote valve.
FIG. 41 is a perspective view of the cam spool 722 of FIG. 40.

Combination of the safety device monitoring the control system of a remote valve is shown diagrammatically in FIG. 40 wherein the supply air to both ends of an actuator 700 is led thru pipes 702 and 704 from an external automatic four way valve 706 which receives and exhausts air through pipes 708 and 710 respectively, and is controlled to cycle actuator 700 automatically by power pulses received through a power pulse conductor 712 leading from a power pulse transmitting timer 714. The rod end head includes primary block 715 and secondary block 716. Switches 717 and 718 are provided on the actuator heads, each switch being arranged to be actuated by a rod 720 which is in turn actuated by a rotatable cam spool 722 within the head. The cam spool, shown in detail in FIG. 41, contains a cam surface 723 and is accessible for resetting exteriorly of the head. It is controlled by a hammer 724, a torsion spring 725, and a latch 726 which are similar to those of the spool 526 of FIG. 33. The latch pin 726 is shown in phantom lines in FIG. 41 and in dotted lines in FIG. 40 as it would be positioned when engaged in notch 727 permitting switch 718 to be inoperative. When the latch is forced into the spool by the hammer 724, the spool rotates as shown by the arrow, raising rod 720 and operating the switch, the latch pin then being in position 726*a*. Switches 717 and 718 are connected via power pulse conductors 728 and 729 into the power pulse conductor 712 leading from the timer, to interrupt the flow of power pulses to valve 706 when either switch is actuated, thereby stopping the actuator until spool 722 can be reset.

Fourth Species of Safety Device

Figure 42:
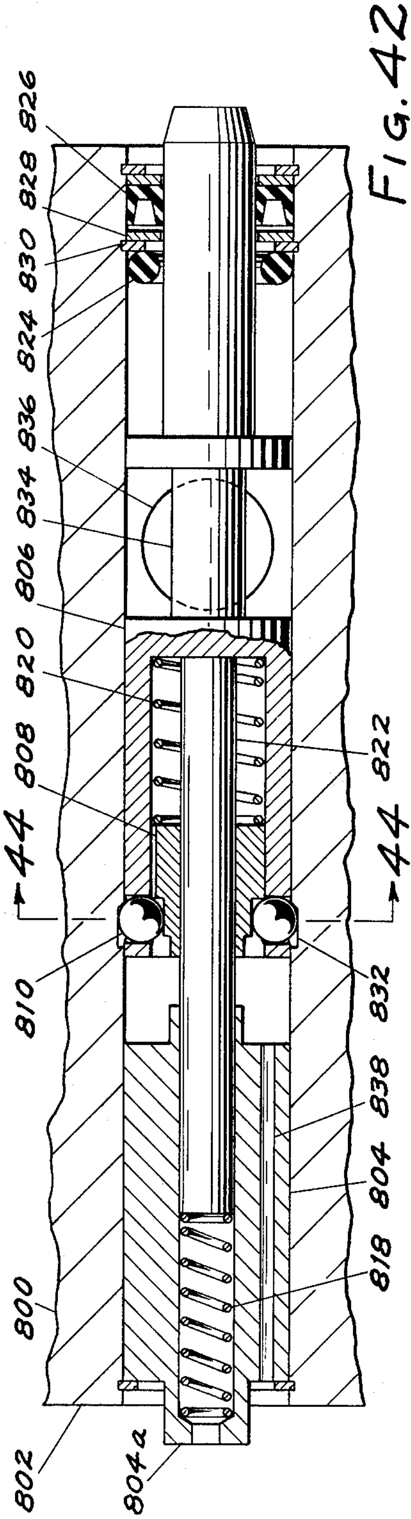
FIG. 42 is an enlarged longitudinal sectional view of a fourth species of the safety device with the spool positioned to permit air flow, taken on line 42—42 of FIG. 44.
Figure 43:
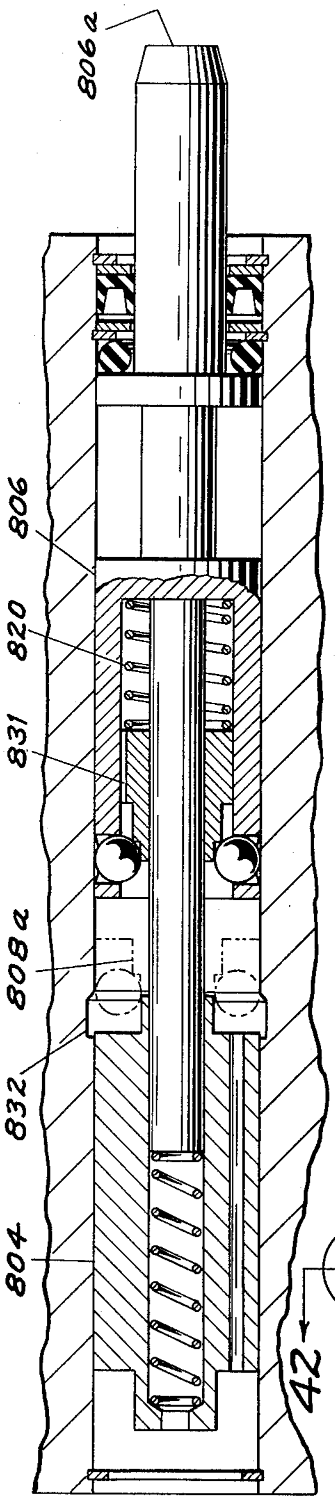
FIG. 43 is a similar view of the device of FIG. 42 with the spool positioned to prevent air flow.
Figure 44:
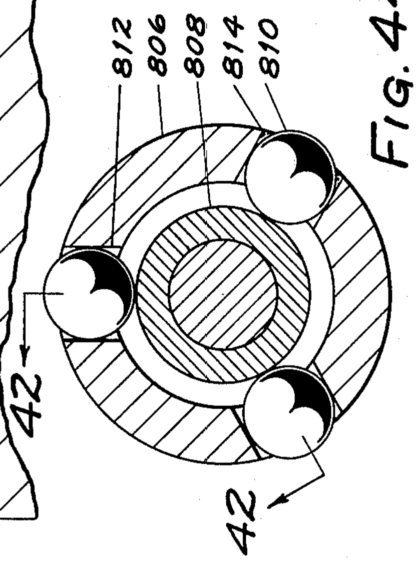
FIG. 44 is a transverse section at line 44—44 of FIG. 42.

Each of the three species of safety device previously described employs a rotative spool to monitor the flow of supply air. The fourth species employs a sliding spool valve for the same purpose, and, as illustrated in the enlarged views of FIGS. 42-43, it is applicable to an actuator head block 800 which has a stop surface 802 for the actuator piston similar to surface 569 of FIG. 31, the end 804*a* of hammer 804 protruding therefrom to be moved each time the actuator piston approaches surface 802. As seen in FIGS. 43-44 the spool 806 carries a stepped cone 808 actuating a plurality of steel balls 810 movable radially in holes 812. The holes may be peened as shown in phantom at 814 or the cone may be magnetized steel to retain the balls before the spool is installed in the head. Other features shown in FIGS. 42-43 are the light springs 818 and 820, the rod 822, a rubber "0" ring 824 which acts as a shock absorber, and seal 826 which is retained by washers 828 and snap rings 830 to prevent the escape of air. Vent groove 831 permits equalization of air pressure both sides of cone 808.

Operation of Fourth Species

The spool is retained in the position of FIG. 42, the balls being expanded outward into groove 832 by the cone, thus permitting supply air for the actuator to pass freely around neck 834 into passageway 836 (which corresponds to passageway 520 of FIG. 31). When end 804*a* of the slidable inertia hammer 804 is struck by the actuator moving at a dangerously high speed, the hammer moves by inertia against the action of light spring 818, and in traveling to its position of FIG. 43 moves the cone against spring 820 ihto the phantom line position 808*a* releasing the balls from groove 832 and permitting the spool to move into its solid line position 806 of FIG. 43 to close passageway 836. The spool is moved very quickly by spring 818 combined with air pressure from the actuator cylinder entering through vent 838 so that a shock absorbing "O" ring as at 824 helps to protect seal 826.

A user, experiencing a shut-down of his pneumatic actuator due to action of this safety device, can resume operation by repairing the defect causing stoppage and resetting the device by pushing spool end 806*a* inward until the balls lock the spool in place.

Remark on Safety Device

It has been proven by numerous actual tests with actuators containing decelerators and safety devices as described herein, that when a hydraulic decelerator malfunctions, it usually does so by losing its fluid gradually, and during subsequent strokes, the air piston gradually reaches an end velocity sufficient to close the safety device valve without striking the actuator head even one harmful blow. Even if the decelerator should fail instantly, one heavy blow to the head is all that is possible before the safety device operates.

What is claimed is:

1. A hydraulic cartridge of the type having a body supporting a sealed enclosure containing fluid, said enclosure containing a high pressure chamber and low pressure reservoir space, a reciprocative plunger having a working stroke and a first portion external of said enclosure adapted to receive actuating loads, said plunger having a second portion connected to the first portion and extending within the enclosure, there being a fluid seal encircling said plunger between said first and second portions, said second portion extending through a primary part of the reservoir space to the high pressure chamber and forming a movable barrier between the high pressure chamber and said primary part of the reservoir space to resist movement of the plunger, wherein the improvement comprises: a cylinder having intrinsically a wall with inner and outer surfaces and first and second open ends, a tubular jacket member secured to the cylinder having intrinsically one open muzzle end and one end at least partially enclosed, said jacket encircling a portion of the length of said cylinder, a closure for the second end of said cylinder retained by said jacket, there being passage means for flow of fluid from said high pressure chamber between the jacket and cylinder to permit movement of said plunger, a flexible expandable bladder forming a variable volume secondary part of the reservoir space, the bladder having first and second anchor portions respectively encircling portions of said cylinder and jacket thereby enclosing the muzzle end of the jacket within the secondary part of the reservoir space, and means sealing said anchor portions to said cylinder and jacket, there being a discontinuous external circumferential flange extending radially outward from the outer surface of the cylinder, the muzzle end of the jacket extending beyond said flange and being swaged radially inward forming an annular header chamber encircling said cylinder and forming a passageway communicating with flow passages leading from the high pressure chamnber and the primary and secondary reservoir spaces.

2. A hydraulic cartridge of the type having a body supporting a sealed enclosure containing fluid, said enclosure containing a high pressure chamber and low pressure reservoir space, a reciprocative plunger having a working stroke and a first portion external of said enclosure adapted to receive actuating loads, said plunger having a second portion connected to the first portion and extending within the enclosure, there being a fluid seal encircling said plunger between said first and second portions, said second portion extending through a primary part of the reservoir space to the high pressure chamber and forming a movable barrier between the high pressure chamber and said primary part of the reservoir space to resist movement of the plunger, wherein the improvement comprises: a cylinder having intrinsically a wall with inner and outer surfaces and first and second open ends, a tubular jacket member secured to the cylinder having intrinsically one open muzzle end and one end at least partially enclosed, said jacket encircling a portion of the length of said cylinder, a closure member for the second end of said cylinder retained by said jacket, there being passage means for flow of fluid from said high pressure chamber between the jacket and cylinder to permit movement of said plunger, a flexible expandable bladder forming a variable volume secondary part of the reservoir space, the bladder having a first and second anchor portions respectively encircling portions of said cylinder and jacket thereby enclosing the muzzle end of the jacket within the secondary part of the reservoir space and means sealing said anchor portions of said cylinder and jacket, said first anchor portion of said bladder being adjacent the first end of said cylinder, the cylinder being provided with an internal circumferential groove, a cylinder closure member for said first end of the cylinder provided with bearing means for guiding said plunger, said cylinder closure member for the first end of the cylinder being retained in said cylinder by a snap ring engaged in said circumferential groove, said cylinder closure member for the first end of the cylinder having an end flange extending radially beyond the outer diameter of said bladder first anchor portion to retain said bladder, said snap ring being disengageable by axial pressure applied to said end flange.

3. The subject matter of claim 2, and said closure for the second end of the cylinder being a plug member fitting snugly within the end of the cylinder and exposed to the surges of pressure within the high pressure chamber, said plug having an enlarged portion with a shoulder external of the cylinder, the enclosed end of the jacket supporting said shoulder firmly against the end of the cylinder to prevent rocking and fretting of said plug within the cylinder due to said surges of pressure, and filter means and a fluid duct constructed and arranged within said plug to filter a portion of the fluid passing from the high pressure chamber to the reservoir space during a working stroke, proximity of said jacket to said cylinder being effective in restricting said passage means for controlling speed of movement of said plunger, said jacket thereby being subject to fluid erosion necessitating its eventual replacement, said plug member being withdrawable from said cylinder to facilitate filter replacement after removal of said jacket.

4. A hydraulic cartridge of the type having a body supporting a sealed enclosure containing fluid, said enclosure containing a high pressure chamber and low pressure reservoir space, a reciprocative plunger having a working stroke and a first portion external of said enclosure adapted to receive actuating loads, said plunger having a second portion connected to the first portion and extending within the enclosure, there being a fluid seal encircling said plunger between said first and second portions, said second portions extending through a primary part of the reservoir space to the high pressure chamber and forming a movable barrier between the high pressure chamber and said primary part of the reservoir space to resist movement of the plunger, wherein the improvement comprises: a cylinder having intrinsically a wall with inner and outer surfaces and first and second open ends, a tubular jacket member secured to the cylinder having intrinsically one open muzzle end and one end at least partially enclosed, said jacket encircling a portion of the length of said cylinder, a closure for the second end of said cylinder retained by said jacket, there being passage means for flow of fluid from said high pressure chamber between the jacket and cylinder to permit movement of said plunger, a flexible expandable bladder forming a variable volume secondary part of the reservoir space, the bladder having first and second anchor portions respectively encircling portions of said cylinder and jacket thereby enclosing the muzzle end of the jacket within the secondary part of the reservoir space and means sealing said anchor portions to said cylinder and jacket, said first anchor portion of the bladder being adjacent the first end of the cylinder, a first clamp ring constricting said first anchor portion into tight contact with the cylinder, a cylinder closure member retained in the first end of the cylinder, said cylinder closure member retained in the said first end of the cylinder having an end flange extending radially beyond the inner diameter of said first clamp ring thereby to retain said clamp ring in place.

5. The subject matter of claim 4, said first clamp ring being provided with an external shape adapted to permit axial air flow thereby, when said clamp ring is supported within a close fitting encircling cylindrical bore.

6. A hydraulic cartridge of the type having a body supporting a sealed enclosure containing fluid, said enclosure containing a high pressure chamber and low pressure reservoir space, a reciprocative plunger having a working stroke and a first portion external of said enclosure adapted to receive actuating loads, said plunger having a second portion connected to the first portion and extending within the enclosure, there being a fluid seal encircling said plunger between said first and second portions, said second portion extending through a primary part of the reservoir space to the high pressure chamber and forming a movable barrier between the high pressure chamber and said primary part of the reservoir space to resist movement of the plunger, wherein the improvement comprises: a cylinder having intrinsically a wall with inner and outer surfaces and first and second open ends, a tubular jacket member secured to the cylinder having intrinsically one open muzzle end and one end at least partially enclosed, said jacket encircling a portion of the length of said cylinder, a closure for the second end of said cylinder retained by said jacket, there being passage means for flow of fluid from said high pressure chamber between the jacket and cylinder to permit movement of said plunger, a flexible expandable bladder forming a variable volume secondary part of the reservoir space, the bladder having first and second anchor portions respectively encircling portions of said cylinder and jacket thereby enclosing the muzzle end of the jacket within the secondary part of the reservoir space, and means sealing said anchor portions to said cylinder and jacket, said movable barrier comprising a piston larger in diameter than the adjacent part of said plunger, said plunger seal being a diaphragm having an invaginable wall with one end attached to the plunger, said diaphragm having a rim portion annular in shape, an annular quill member and a piston stop ring member secured within said cylinder confining, pressurizing, and sealing said rim portion therebetween against the inner wall of said cylinder, said quill member having a bore supporting said invaginable wall against the fluid, said piston stop ring providing means to limit the stroke of said plunger.

7. The subject matter of claim 6, and a closure member for the first end of the cylinder supporting bearing means for guiding said plunger, said closure member for the first end of the cylinder being retained within the end of said cylinder, said quill being slidable within said cylinder, a spring washer between said closure member for the first end of the cylinder and said quill providing resilient axial force holding said quill against said diaphragm rim portion to maintain sealing pressure within said rim.

8. A hydraulic cartridge of the type having a body supporting a sealed enclosure containing fluid, said enclosure containing a high pressure chamber and low pressure reservoir space, a reciprocative plunger having a working stroke and a first portion external of said enclosure adapted to receive actuating loads, said plunger having a second portion connected to the first portion and extending within the enclosure, there being a fluid seal encircling said plunger between said first and second portions, said second portion extending through a primary part of the reservoir space to the high pressure chamber and forming a movable barrier between the high pressure chamber and said primary part of the reservoir space to resist movement of the plunger, wherein the improvement comprises: a cylinder having intrinsically a wall with inner and outer surfaces and first and second open ends, a tubular jacket member having a muzzle end circumferentially open to fluid flow, said jacket being secured to the cylinder closely spaced from said outer cylinder surface throughout a major portion of its interior length including its muzzle end, said jacket having one end at least partially enclosed, a closure for the second end of said cylinder retained by said jacket, there being passage means for fluid to flow from said high pressure chamber between the jacket and cylinder to said reservoir space to permit movement of said plunger, a flexible elastomeric bladder having induced circumferential tension forming a variable volume secondary part of the reservoir space and maintaining reserve pressure in the fluid tending to extrude said plunger, the bladder having first and second anchor portions respectively encircling portions of said cylinder and jacket thereby enclosing the muzzle end of the jacket within the secondary part of the reservoir space, and means sealing said anchor portions to said cylinder and jacket, said movable barrier comprising a piston larger in diameter than the adjacent part of said plunger, said plunger seal being a diaphragm having an invaginable wall with one end attached to the plunger, said diaphragm having a rim portion annular in shape, an annular structure and a shaped annular ring member secured within said cylinder confining, pressurizing, and sealing said rim portion therebetween against the inner wall of said cylinder, said annular structure having a bore supporting said invaginable wall against the fluid, said shaped annular ring member providing means to limit the stroke of said plunger.

9. The subject matter of claim 8, and said closure for the second end of the cylinder being a plug member provided with a threaded bore and passageway communicating between said high pressure chamber and reservoir space, a valve seat at the end of said bore in communication with said passageway, a valve member fitted to said seat having an external thread engaged within said bore, the enclosed end of the jacket being provided with an axial opening having an internal shoulder, and fluid seal means held within the opening by annular retaining means having a reduced inner diameter smaller than a portion of said valve member, said valve member extending into said opening and being adjustable relative to said seat and being prevented from being withdrawn from said seal by said reduced diameter.

10. The subject matter of claim 8, and an encasement structure surrounding said bladder and having an impervious wall, sealing means contacting said encasement and forming an airtight chamber around said bladder, said encasement being provided with an air inlet port adapted for connection to an air conduit to permit air pressure to be brought to bear against the exterior of said bladder, there being friction means interposed between said plunger and a stationary portion of said cartridge, said tension of the bladder being established to maintain reserve pressure in said fluid sufficient to prevent relaxation and wrinkling of the diaphragm but insufficient to move the plunger against the resistance of said friction means, said air inlet permitting introduction of air pressure to compress said bladder and augment said reserve pressure to overcome the resistance of said friction means and extrude the plunger.

11. The subject matter of claim 8, there being check valve means within said high pressure chamber comprising a seat area, a movable valve element and a closing spring for the movable valve element for permitting fast flow of fluid from said reservoir to said high pressure chamber for quick plunger return, and an encasement structure surrounding said bladder and having an impervious wall, sealing means contacting said encasement and forming an airtight chamber around said bladder, said encasement being provided with an air inlet port adapted for connection to an air conduit to permit air pressure to be brought to bear against the exterior of said bladder, said bladder having an amount of induced circumferential tension which maintains reserve fluid pressure slightly above that necessary to prevent relaxation and wrinkling of the diaphragm but insufficient to open the check valve and extend the plunger, the said seat area and closing spring force against the movable valve element being correlated with said induced circumferential tension of the bladder to effect opening of said valve at a fluid pressure slightly higher than that maintained by said bladder, said air inlet port permitting introduction of air pressure to compress said bladder to augment said reserve pressure sufficiently to open the check valve and extrude the plunger.

12. A hydraulic cartridge of the type having a body supporting a sealed enclosure containing fluid, said enclosure containing a high pressure chamber and low pressure reservoir space, a reciprocative plunger having a working stroke and a first portion external of said enclosure adapted to receive actuating loads, said plunger having a second portion connected to the first portion and extending within the enclosure, there being a fluid seal encircling said plunger between said first and second portions, said second portion extending through a primary part of the reservoir space to the high pressure chamber and forming a movable barrier between the high pressure chamber and said primary part of the reservoir space to resist movement of the plunger, wherein the improvement comprises: a cylinder having intrinsically a wall with inner and outer surfaces and first and second open ends, said first end extending beyond said fluid seal and being devoid of fluid, a tubular jacket member having a muzzle end circumferentially open to fluid flow, said jacket being secured to the cylinder closely spaced from said cylinder outer surface throughout a major portion of its interior length including its muzzle end, said jacket having one end at least partially enclosed, a closure for the second end of said cylinder retained by said jacket, there being passage means for fluid to flow from said high pressure chamber between the jacket and cylinder to said reservoir space to permit movement of said plunger, a flexible elastomeric bladder having induced circumferential tension forming a variable volume secondary part of the reservoir space and maintaining reserve pressure in the fluid tending to extrude said plunger, the bladder having first and second anchor portions respectively encircling portions of said cylinder and jacket thereby enclosing the muzzle end of the jacket within the secondary part of the reservoir space and means sealing said anchor portions to said cylinder and jacket, said first anchor portion of the bladder being sealed in position adjacent the first end of said cylinder, a closure member fitting slidably within said cylinder adjacent said first end, said closure member adjacent said first end having an end flange extending radially into sealing contact with said first anchor portion of the bladder.

13. A hydraulic cartridge of the type having a body supporting a sealed enclosure containing fluid, said enclosure containing a high pressure chamber and low pressure reservoir space, a reciprocative plunger having a working stroke and a first portion external of said enclosure adapted to receive actuating loads, said plunger having a second portion connected to the first portion and extending within the enclosure, there being a fluid seal encircling said plunger between said first and second portions, said second portion extending through a primary part of the reservoir space to the high pressure chamber and forming a movable barrier between the high pressure chamber and said primary part of the reservoir space to resist movement of the plunger, wherein the improvement comprises: a cylinder having intrinsically a wall with inner and outer surfaces and first and second open ends, a tubular jacket member having a muzzle end circumferentially open to fluid flow, said jacket being secured to the cylinder closely spaced from said outer cylinder surface throughout a major portion of its interior length including its muzzle end, said jacket having one end at least partially enclosed, a closure for the second end of said cylinder retained by said jacket, there being passage means for fluid to flow from said high pressure chamber between the jacket and cylinder to said reservoir space to permit movement of said plunger, a flexible elastomeric bladder having induced circumferential tension forming a variable volume secondary part of the reservoir space and maintaining reserve pressure in the fluid tending to extrude said plunger, the bladder having first and second anchor portions respectively encircling portions of said cylinder and jacket thereby enclosing the muzzle end of the jacket within the secondary part of the reservoir space, and first and second clamp rings sealing said first and second anchor portions respectively to said cylinder and jacket.

14. The subject matter of claim 13, said first anchor portion being sufficiently smaller in diameter than the second anchor portion to permit the second clamp ring to have an innermost diameter large enough to pass freely over the first anchor portion of the bladder.

15. The subject matter of claim 13, each of said clamp rings being shaped with an internal bell mouth oriented after installation to face the expandable portion of the bladder to permit millions of dilations of said bladder next said rings without deterioration of the elastomer due to stress concentration.

16. A hydraulic cartridge of the type having a body supporting a sealed enclosure containing fluid, said enclosure containing a high pressure chamber and low pressure reservoir space, a reciprocative plunger having a working stroke and a first portion external of said enclosure adapted to receive actuating loads, said plunger having a second portion connected to the first portion and extending within the enclosure, there being a fluid seal encircling said plunger between said first and second portions, said second portion extending through a primary part of the reservoir space to the high pressure chamber and forming a movable barrier between the high pressure chamber and said primary part of the reservoir space to resist movement of the plunger, wherein the improvement comprises: a cylinder having intrinsically a wall with inner and outer surfaces and first and second open ends, a tubular jacket member secured to the cylinder having intrinsically one open muzzle end and one end at least partially enclosed, said jacket encircling a portion of the length of said cylinder, a closure for the second end of said cylinder retained by said jacket, there being passage means for flow of fluid from said high pressure chamber between the jacket and cylinder to permit movement of said plunger, a flexible expandable bladder forming a variable volume secondary part of the reservoir space, the bladder having first and second anchor portions respectively encircling portions of said cylinder and jacket thereby enclosing the muzzle end of the jacket within the secondary part of the reservoir space, and means sealing said anchor portions to said cylinder and jacket, there being a discontinuous external circumferential shoulder extending radially outward from the outer surface of the cylinder, the muzzle end of the jacket contacting said flange and forming a passageway communicating with flow passages leading from the high pressure chamber and the primary and secondary reservoir spaces.

17. A hydraulic cartridge of the type having a body supporting a sealed enclosure containing fluid, said enclosure containing a high pressure chamber and low pressure reservoir space, a reciprocative plunger having a working stroke and a first portion external of said enclosure adapted to receive actuating loads, said plunger having a second portion connected to the first portion and extending within the enclosure, there being a fluid seal encircling said plunger between said first and second portions, said second portion extending through a primary part of the reservoir space to the high pressure chamber and forming a movable barrier between the high pressure chamber and said primary part of the reservoir space to resist movement of the plunger, wherein the improvement comprises: a cylinder having intrinsically a wall with inner and outer surfaces and first and second open ends, a tubular metallic jacket member having an intrinsically open muzzle end, said jacket encircling a portion of the length of said cylinder and being secured to the cylinder closely spaced from said outer cylinder surface throughout a major portion of its length, said jacket having an outer circumferential wall extending throughout a major portion of its length forming a portion of the exterior wall of said cartridge, said jacket having one end at least partially enclosed, closure means for the second end of said cylinder retained by said jacket, a tubular flexible elastomeric bladder surrounding a portion of said cylinder in tandem to said jacket and forming a variable volume secondary part of the reservoir space, said bladder having induced circumferential tension maintaining reserve pressure in the fluid tending to extrude the plunger, said bladder having first and second end portions respectively sealed to said cylinder and jacket, there being passage means which, during each working stroke, channel fluid to flow from said high pressure chamber between the jacket and cylinder, then to enter the bladder to permit movement of said plunger, said fluid seal encircling said plunger being a diaphragm having an invaginable wall with one end attached to the plunger, said diaphragm having a rim portion annular in shape, an annular structure secured within said cylinder confining, pressuring, and sealing said rim portion against the inner wall of said cylinder, said annular structure having a bore supporting said invaginable wall against the fluid.

18. The subject matter of claim 17, and means to maximize duration of the reserve pressure in the fluid, said means comprising a plurality of garter springs under tension encircling said bladder.

19. The subject matter of claim 17, said bladder having outer circumferential wall area extending throughout a major portion of its length forming a portion of the exterior wall of said cartridge and being thereby exposed to the temperature of the cartridge environment.

20. The subject matter of claim 17, and said closure means for the second end of the cylinder being a plug member provided with a threaded bore and passageway communicating between said pressure chamber and reservoir space, a valve seat at the end of said bore in communication with said passageway, a valve member fitted to said seat having an external thread engaged with said bore, the enclosed end of the jacket being provided with an axial opening having an internal shoulder, and fluid seal means held within the opening by annular retaining means having a reduced inner diameter smaller than a portion of said valve member, said valve member extending into said opening and being adjustable relative to said seat and being prevented from being withdrawn from said seal by said reduced inner diameter.

21. The subject matter of claim 20, the jacket being spaced from the outer cylinder surface adjacent said second end of the cylinder to permit flow of fluid from said valve member, said plug member having a portion fitting snugly within said cylinder, and an enlarged portion with a shoulder external of said cylinder, said enlarged portion adjacent said second end of the cylinder fitting snugly within said jacket to prevent radial movement of the plug and jacket in respect to the cylinder, said passageway including a duct provided in said enlarged portion to communicate with the space between said jacket and cylinder.

22. The hydraulic cartridge of claim 17 wherein the said outer circumferential wall of said jacket, by forming a portion of the exterior wall of said cartridge, is thereby exposed to the temperature of the cartridge environment, said passage means being arranged so that fluid leaving the high pressure chamber flows in direct contact with the interior of said jacket, said fluid thereby being exposed to the temperature of the jacket so that during multiple working strokes, if the jacket is being cooled by exposure to the cartridge environment, fluid is also being cooled as it flows from said high pressure chamber toward said bladder.

23. The subject matter of claim 17, said bladder having intrinsically an inner tubular wall formed of a primary material, said inner wall being surrounded by an outer tubular wall formed of a secondary material, said primary and secondary materials both being flexible but differing in characteristics to permit said inner wall to resist deterioration by hydraulic fluid and to permit said outer wall to resist deterioration by a hostile exterior environment.

24. A hydraulic cartridge of the type having a body supporting a sealed enclosure containing fluid, said enclosure containing a high pressure chamber and low pressure reservoir space, a reciprocative plunger having a working stroke and a first portion external of said enclosure adapted to receive actuating loads, said plunger having a second portion connected to the first portion and extending within the enclosure, there being a fluid seal encircling said plunger between said first and second portions, said second portion extending through a primary part of the reservoir space to the high pressure chamber and forming a movable barrier between the high pressure chamber and said primary part of the reservoir space to resist movement of the plunger, wherein the improvement comprises: a cylinder having intrinsically a wall with inner and outer surfaces and first and second open ends, a tubular flexible elastomeric bladder surrounding a portion of said cylinder forming a variable volume part of said sealed enclosure and forming a secondary part of the reservoir space, said bladder having induced circumferential tension maintaining reserve pressure in the fluid tending to extend the plunger, there being passage means, which during each working stroke, channel fluid to flow from said high pressure chamber into said bladder to permit movement of said plunger, said fluid seal encircling said plunger being a diaphragm having an invaginable wall with one end attached to the plunger, said diaphragm having a rim portion annular in shape, an annular structure secured within said cylinder confining, pressuring, and sealing said rim portion against the inner wall of said cylinder, said annular structure having a bore supporting said invaginable wall against the fluid, there being check valve means within said high pressure chamber comprising a seat area, a movable valve element and a closing spring for the movable valve element for permitting fast flow of fluid from said reservoir space to said high pressure chamber for quick plunger return, and an encasement structure surrounding said bladder and having an impervious wall, sealing means contacting said encasement and forming an airtight chamber around said bladder, said encasement being provided with an air inlet port adapted for connection to an air conduit to permit air pressure to be brought to bear against the exterior of said bladder, said bladder having an amount of induced circumferential tension which maintains reserve fluid pressure slightly above that necessary to prevent relaxation and wrinkling of the diaphragm but insufficient to open the check valve and extend the plunger, the said seat area and closing spring force against the movable valve element being correlated with said induced circumferential tension of the bladder to effect opening of said valve at a fluid pressure slightly higher than that maintained by said bladder, said air inlet port permitting introduction of air pressure to compress said bladder to augment said reserve pressure sufficiently to open the check valve and extrude the plunger.

* * * * *